United States Patent
Ikeda

(10) Patent No.: US 7,184,975 B2
(45) Date of Patent: Feb. 27, 2007

(54) SALES SYSTEM AND SALES PROCESSING APPARATUS FOR SELLING AN INTANGIBLE PRODUCT AND A TANGIBLE PRODUCT

(75) Inventor: Kiyokazu Ikeda, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/984,328

(22) Filed: Nov. 8, 2004

(65) Prior Publication Data

US 2005/0091125 A1 Apr. 28, 2005

Related U.S. Application Data

(62) Division of application No. 09/891,840, filed on Jun. 26, 2001, now Pat. No. 6,938,006.

(30) Foreign Application Priority Data

Jun. 29, 2000 (JP) ............................ P2000-201461

(51) Int. Cl.
*G06Q 30/00* (2006.01)
(52) U.S. Cl. .......................................... 705/26; 705/27
(58) Field of Classification Search .................... 705/4, 705/14, 26, 27
See application file for complete search history.

(56) References Cited

U.S. PATENT DOCUMENTS

| | | | |
|---|---|---|---|
| 5,873,066 A * | 2/1999 | Underwood et al. | 705/4 |
| 6,119,098 A * | 9/2000 | Guyot et al. | 705/14 |
| 6,163,770 A * | 12/2000 | Gamble et al. | 705/4 |
| 6,167,383 A * | 12/2000 | Henson | 705/26 |
| 6,182,048 B1 * | 1/2001 | Osborn et al. | 705/4 |
| 6,246,996 B1 * | 6/2001 | Stein et al. | 705/26 |
| 6,282,517 B1 * | 8/2001 | Wolfe et al. | 705/36 R |
| 6,285,986 B1 * | 9/2001 | Andrews | 705/26 |
| 6,298,330 B1 * | 10/2001 | Gardenswartz et al. | 705/14 |
| 6,317,722 B1 * | 11/2001 | Jacobi et al. | 705/14 |
| 6,415,226 B1 * | 7/2002 | Kozak | 701/210 |
| 6,574,609 B1 * | 6/2003 | Downs et al. | 705/50 |
| 6,862,580 B1 * | 3/2005 | Ford | 705/37 |
| 6,895,393 B1 * | 5/2005 | Numata et al. | 705/52 |
| 7,035,823 B2 * | 4/2006 | Murad et al. | 705/39 |
| 2001/0011232 A1 * | 8/2001 | Peterson et al. | 705/26 |
| 2001/0037265 A1 * | 11/2001 | Kleinberg | 705/27 |
| 2001/0051884 A1 * | 12/2001 | Wallis et al. | 705/4 |

(Continued)

FOREIGN PATENT DOCUMENTS

WO WO-0008909 A2 * 2/2000

OTHER PUBLICATIONS

Schwanhausser, M., "Q & A: Determining Adequacy of Your Homeowners Insurance," San Jose Mercury News, Morning Final Edition, p. 21A, Oct. 27, 1991.*

(Continued)

*Primary Examiner*—Nicholas D. Rosen
(74) *Attorney, Agent, or Firm*—Lerner, David, Littenberg, Krumholz & Mentlik, LLP

(57) ABSTRACT

An intangible product sales server for selling intangible products and a tangible product sales server for selling tangible products associated with the intangible products cooperate to simplify purchase procedures to be followed by users in purchasing tangible and intangible products in combination.

9 Claims, 16 Drawing Sheets

U.S. PATENT DOCUMENTS

| | | | |
|---|---|---|---|
| 2003/0088463 A1* | 5/2003 | Kanevsky et al. | 705/14 |
| 2004/0083125 A1* | 4/2004 | Almeida et al. | 705/4 |
| 2005/0038713 A1* | 2/2005 | Pickard et al. | 705/26 |
| 2005/0091175 A9* | 4/2005 | Farmer | 705/400 |
| 2006/0085263 A1* | 4/2006 | Greer et al. | 705/14 |

OTHER PUBLICATIONS

Emling, S., "Personal Business The Price of Protection/ Part II Consumer's Guide to Insurance," Atlanta Constitution, p. E4, Jul. 1, 1996.*

Anon., "Briefs," Insurance Regulator, vol. 9, No. 91, Mar. 2, 1998.*

Martin, P., "Survival of the Fittest: As the Threat of Deflation Draws Closer, Companies Must Expand to Stay Afloat," Financial Times, London Edition, p. 18, Jul. 14, 1998.*

Anon., "PNI Teams with Digital Vision," PR Newswire, Sep. 28, 1998.*

Schonfeld, E., "The Amazon.com of Cyberbabies," Fortune, vol. 138, No. 10, p. 264, Nov. 23, 1998.*

Anon., "Online Auto Parts Business Puts Brakes on the Web," Newsbytes News Network, Jun. 8, 1999.*

Anon., "Security Provider Bundles Free Alarm System, Free PC and Free Internet in Charitable Drive," Business Wire, Jun. 10, 1999.*

Anon., "Biz-2-Biz Q&A," Adweek (Eastern Edition), vol. 40, No. 38, p. 78, Sep. 20, 1999.*

Roush, M., "Bendix Sells Brake Parts Online," Automotive News, No. 5847, p. 24J, Nov. 8, 1999.*

Fridman, S., "Surveys Show Online Consumers Want Privacy Nov. 8, 1999," Newsbytes, Nov. 8, 1999.*

Anon., "EDITORIAL Internet Surfer Beware," Denver Post, p. B-10, Dec. 1, 1999.*

Anon., "How To Protect Kids' Privacy Online," Business Wire, Feb. 23, 200.*

Anon., "It's Time for Rules in Wonderland: Here's Business Week's Four-Point Plan to Solve the Internet Privacy Mess," Business Week, No. 3673, p. 82, Mar. 20, 2000.*

* cited by examiner

FIG. 5

WELCOME TO XYZ AUTO INSURANCE COMPANY !

<< PLEASE FILL FOLLOWING ENTRIES >>

NAME: TARO TANAKA
INITIAL: T T
E-mail: tanaka@gomail.com
BIRTHDAY: YEAR 1972 MONTH 8 DAY 12 AGE 27
GENDER: MALE
ADDRESS: 〒 263-0041 OTA NISHI, SHINJUKU, TOKYO
2-3-61 TANAKA HEIGHTS 401
TELEPHONE: 0120-361-2392
MOBILE: M-Phone 090-1234-5678
OCCUPATION: SALES SECTION 2, AAA TRADING COMPANY
OFFICE ADDRESS: 〒 123-0021 JINNAN, SHIBUYA, TOKYO
1-2-3

NEXT ▷

FIG. 6 http//www.abcd.efg/co.jp/

WELCOME TO XYZ AUTO INSURANCE COMPANY !

<< PLEASE FILL FOLLOWING ENTRIES >>

CAR MODEL: PRETTY WAGON GT-B
CAR NUMBER: BH5A-123456  CAR CLASS 5
LICENSE NUMBER: SHINAGAWA TA 00 3120
MODEL YEAR: YEAR 1999 MONTH 6 REGISTERED
NEXT INSPECTION JUNE 2002
COMPULSORY LIABILITY INSURANCE:
DAI TOKYO INSURANCE
INSURANCE NUMBER 2356123
VOLUNTARY INSURANCE:
OTASUKE MARINE  SAP  CLASS 14
EXPIRATION YEAR 2000 MONTH 6 DAY 11
INSURANCE NUMBER 23-6231456
PAYMENT: MONTHLY 12000 YEN
BODILY INJURY: NO LIMITATION
PROPERTY DAMAGE: 50000000 YEN
AUTOMOBILE: 3000000 YEN
PASSENGER: 100000000 YEN
AGE LIMIT: UNDER 26 NOT COVERED

FIG. 7

WELCOME TO XYZ AUTO INSURANCE COMPANY !

<< ESTIMATE OF NEW INSURANCE >>

XYZ AUTOMOBILE INSURANCE [TAP] CLASS 15

JUNE 12, 2000         CAR NAVIGATOR TRANSACTION
                      COMPANY : XYZ FINANCE CORPORATION

CAR NAVIGATOR: [NDVD-55SD-1] [INSTALLATION] [INSTALLMENT]
                                             238,000 YEN

CONTRACT YEARS: [3] YEARS [INSTALLMENT]  EXPIRATION DATE
BODILY INJURY: [NO LIMITATION]            JUNE 11, 2003
PROPERTY DAMAGE: [100000000] YEN
AUTOMOBILE: [2500000] YEN
PASSENGER: [NO LIMITATION]
AGE LIMIT: UNDER [26] NOT COVERED
YEARLY TRAVEL DISTANCE: [5000] Km  SECURITY TRANSACTION COMPANY:
                                   XYZ FINANCE CORPORATION

SECURITY: [O] [INSTALLATION] [INSTALLMENT]
           29,800 YEN (MADE OF YY SS-1)

SPECIAL CONTRACT DISCOUNT:
           COMFORTABLE & SAFE CAR NAVIGATION MEMBER
           UNTIL JUNE 11, 2003
           3-YEAR CONTRACT  ALL FRONT SEAT
           AIR BAG  SAFETY CAR BODY
           ABS  IN-CAR THEFT  CAR THEFT
           [FAMILY LIMITED]

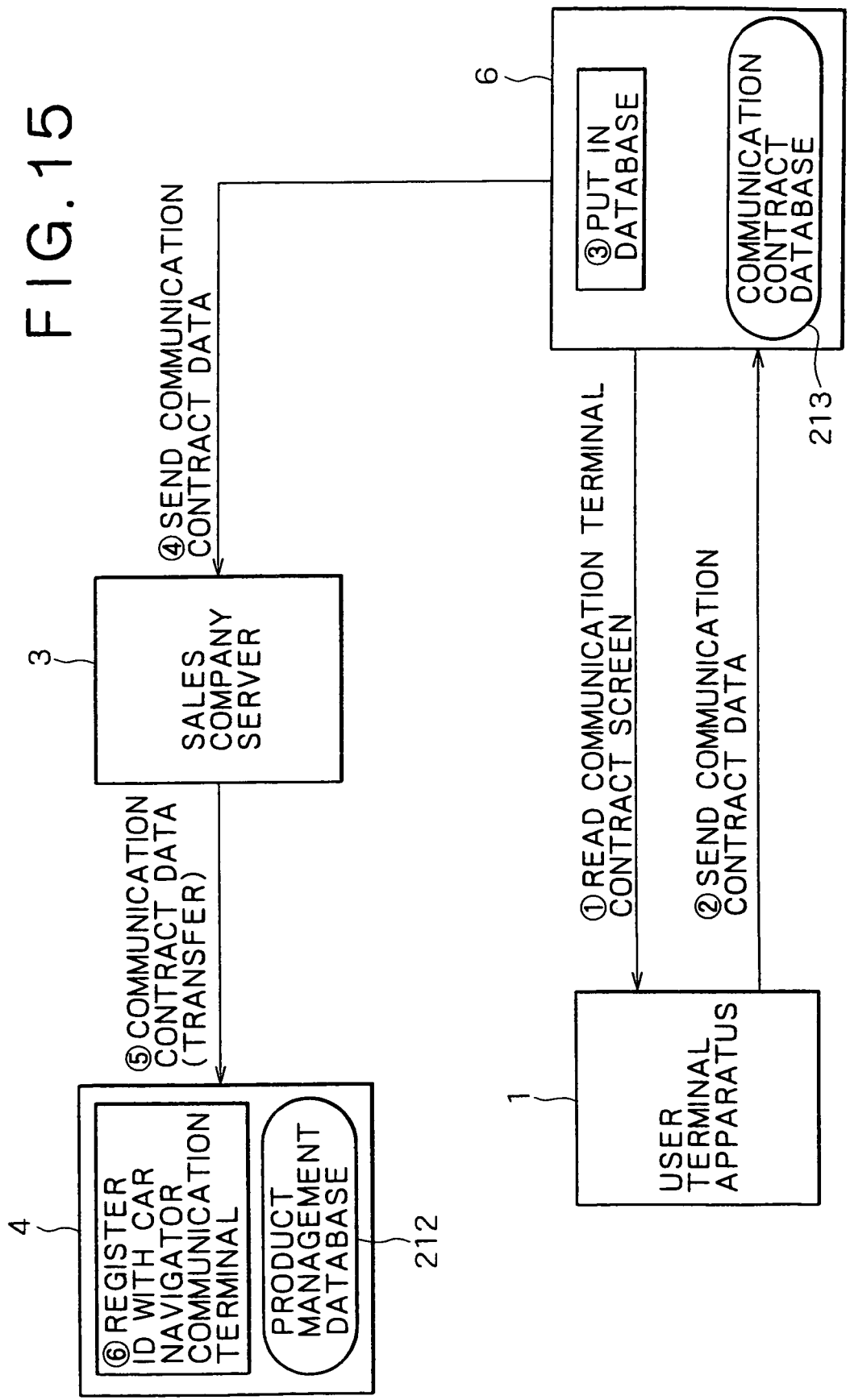

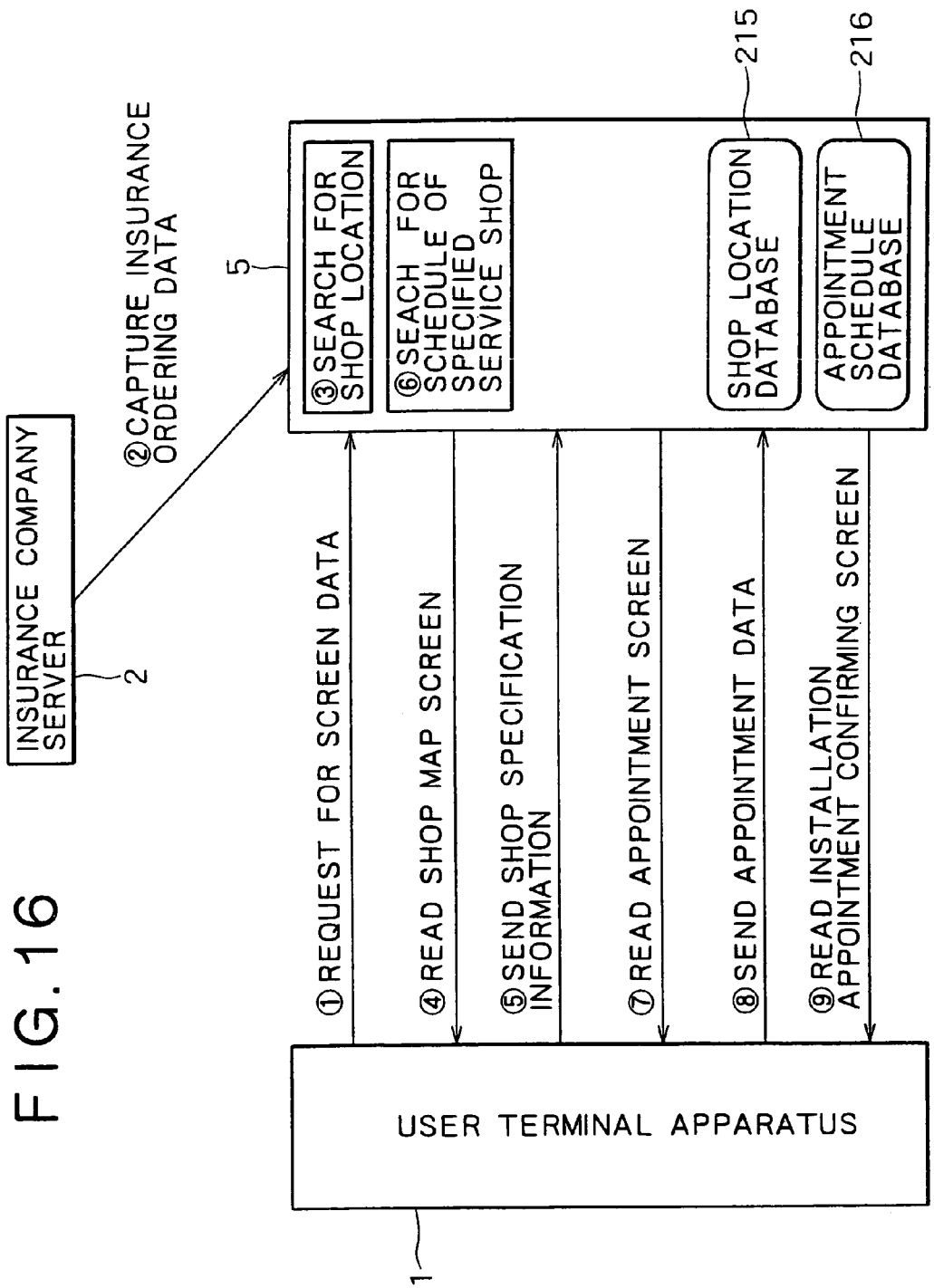

SALES SYSTEM AND SALES PROCESSING APPARATUS FOR SELLING AN INTANGIBLE PRODUCT AND A TANGIBLE PRODUCT

CROSS-REFERENCE TO RELATED APPLICATIONS

This application is a division of U.S. application Ser. No. 09/891,840, filed Jun. 26, 2001, now U.S. Pat. No. 6,938,006 B2, issued on Aug. 30, 2005, the disclosure of which is incorporated herein by reference.

BACKGROUND OF THE INVENTION

The present invention relates generally to a sales method, a sales system, sales processing apparatus, and a terminal apparatus for a plurality of servers to cooperatively sell articles demanded by users.

These days, so-called Internet shopping is becoming increasingly common. In operation, a user as a purchaser, accesses a shopping site on the Internet through his personal computer connected thereto. The user executes a predetermined operation to select a desired article on a page of the accessing site as displayed on a Web browser screen. Then, the user executes a predetermined operation for determining an article to buy and enters predetermined such items for payment procedure as personal information including user's name and address and payment preference.

Also, in addition to the sale of tangibles, the sale of intangibles such as automobile insurance is becoming popular in Internet shopping. Given this background, chances would increase in which users buy both intangibles and tangibles at the same time.

Currently, however, users must access separate Internet sites to buy intangibles and tangibles. For example, if a user wants to buy an intangible and an associated tangible, the user must access a site which sells intangibles and conclude the payment agreements for the purchase and then access a site which sells tangibles by following links for example and conclude the payment agreements for the purchase, entering all required information through his personal computer every time the access is made. This gives the users a lot of time and trouble in purchasing combinations of intangibles and tangibles. In addition, the payment agreements for example must be separately managed for intangibles and tangibles.

SUMMARY OF THE INVENTION

It is therefore an object of the present invention to provide a sales system by which users, or customers, of Internet shopping are able to buy combinations of intangibles and tangibles by a single access operation and an operational procedure as simple as possible, thereby saving the users a lot of time and labor. Such a sales system also allows the selling side to provide the sale of combinations of intangibles and tangibles which no previous system has done before, thereby significantly enhancing the sales efficiency.

In carrying out the invention and according to a first aspect, there is provided a sales method for selling both intangible and tangible products in which at least an intangible product sales server for selling an intangible product and a tangible product sales server for selling a tangible product are interconnected by a network for cooperatively selling the intangible product and the tangible product upon request from a user terminal operated by its user, including the steps of: searching the intangible product sales server for an intangible product desired by the user on the basis of an operation performed through the user terminal and displaying a search result on the user terminal; displaying on the user terminal information about a tangible product associated with the retrieved intangible product, the tangible product being for sale by the tangible product sales server; and if the intangible product and the tangible product displayed on the user terminal have been found sold at a same time, discounting a sales price of one of the intangible product and the tangible product.

According to a second aspect of the present invention, there is provided a sales system for selling an intangible product and a tangible product associated therewith in cooperation between a plurality of servers interconnected via a network, including: a user terminal apparatus, connected to the network, for purchasing the intangible product and the tangible product by executing data communication with each of the plurality of servers on the basis of operation performed by a user; an intangible sales server for handling the purchase of the intangible product from the user terminal, sending to the user terminal information for recommending the purchase of the tangible product sold by another one of the plurality of servers, and, if the user has performed a purchasing process for purchasing the recommended tangible product in response to the recommendation by the intangible product sales server, and executing a discount process for discounting the sales price of the intangible product; and a tangible product sales server, if the user has performed the purchasing process in response to the recommendation by the intangible product sales server, for sending purchase decision information to the intangible product sales server.

According to a third aspect of the present invention, there is provided a cooperative sales system in which a plurality of servers interconnected via a network cooperatively sell a tangible product and an intangible product associated with each other, having: a user terminal apparatus, connected to the network, for the transfer/reception of data about the sale with the plurality of servers and displaying and inputting the data on the basis of an operation performed by a user of the user terminal apparatus; an intangible product sales server, connected to the network, for transferring/receiving data about the sale of the intangible product with the user terminal apparatus and signing a sales contract with the user about the intangible product; and a tangible product sales server, connected to the network, for transferring data about the sale of the tangible product associated with the intangible product with the user terminal apparatus and signing a sales contract with the user about the tangible product; wherein: the user terminal apparatus including: communication means for transferring/receiving data with the plurality of servers; display means for displaying data received by the communication means; operator means for the user to input data to be transmitted to any one of the plurality of servers; and control means for controlling the communication means such that the communication means transfers/receives the data with any one of the plurality of servers connected to the network on the basis of the operation performed by the user through the operator means and controlling the display means such that the data received from any one of the plurality of servers is displayed on the display means; the intangible product sales server including: communication means for transferring/receiving data with another device connected to the network; intangible product data storage means for storing data about the intangible product; user information storage means for storing data about the user supplied from the user terminal apparatus; and control means for searching the intangible product data storage means for the intangible product requested by the user on the basis of intangible product purchase request conditions received from the user terminal apparatus through the communication means, acquiring from the another device information about the tangible product associated with the retrieved intangible product, and transmitting the information about the tangible product to the user terminal apparatus; and the tangible product sales server including: communication means for transferring/receiving data with another device connected to the network; tangible product data storage means for storing product data about the tangible product; user information storage means for storing data about the user; and control means for controlling the user information storage means such that information about the user received from the intangible product server is stored into the user information storage means, controlling the communication means such that the communication means searches tangible product data storage means for the tangible product associated with the data about the intangible product requested by the user received from the intangible product sales server, and transmits data about the retrieved tangible product associated with the intangible product to the intangible product sales server through the network.

According to a fourth aspect of the present invention, there is provided a product cooperative purchase apparatus connected to a network for purchasing both an intangible product and a tangible product from an intangible product sales server and a tangible product sales server respectively connected to the network, including: communication means for communicating one of the servers via the network; display means for displaying data supplied from the intangible product sales server; operator means for a user of the product cooperative purchase apparatus to input a request for the desired intangible product, the inputted request being transmitted to the intangible product sales server; and control means for controlling the communication means such that the communication means is connected to the intangible product sales server via the network, controlling the display means such that information about the intangible product is displayed on the basis of data for purchasing the intangible product received from the intangible product sales server on the display means, and controlling the communication means such that the communication means transmits information for purchasing the intangible product inputted from the operator means to the intangible product sales server.

According to a fifth aspect of the present invention, there is provided an intangible product sales apparatus, connected to a network connected with a user terminal apparatus and a tangible product sales server for selling a tangible product, for selling an intangible product associated with the tangible product, including; communication means for communicating with another device connected to the network; product data storage means for storing data about the intangible product; user information storage means for storing information about a user of the user terminal apparatus transmitted via the network; and control means for controlling the user information storage means such that, the user information on the basis of a request for purchasing the intangible product and the user information received by the communication means from the user terminal apparatus via the network, is stored into the user information storage means, controlling the communication means such that the intangible product desired by the user is searched for on the basis of the purchase request, from the product data storage means, information about the retrieved intangible product and data about the tangible product for sale by the tangible product sales server associated with the intangible product is transmitted to the user terminal apparatus via the network.

According to a sixth aspect of the present invention, there is provided a tangible product sales apparatus, connected to a network connected with a user terminal apparatus and an intangible product sales server for selling an intangible product, for selling a tangible product associated with the intangible product, including: communication means for communicating data with another device connected to the network; product data storage means for storing data about the tangible product; user information storage means for storing information about a user received from the another device connected to the network; and control means for controlling the user information storage means such that, on the basis of intangible product information about the intangible product desired by the user and the user information received from the intangible product sales product server, the user information is stored into the user information storage means, controlling the communication means such that the product data storage means is searched for tangible product information associated with the intangible product, the retrieved product data is transmitted to the another device connected to the network.

BRIEF DESCRIPTION OF THE DRAWINGS

These and other objects of the invention will be seen by reference to the description, taken in connection with the accompanying drawing, in which:

FIG. 5 shows an exemplary personal information input screen through which a user enters his personal information necessary for an automobile insurance purchase order;

FIG. 6 shows an exemplary insurance purchase ordering screen;

FIG. 7 shows an exemplary insurance and car navigator purchase ordering screen;

FIG. 15 is a diagram describing the information transfer between the user terminal and the servers of the sales system of FIG. 1 which takes place when user concludes the agreements with a telecommunication carrier about a wireless terminal of the purchased car navigator; and FIG. 16 is a diagram describing the information transfer between the user terminal and the servers of the sales system of FIG. 1 which takes place when the user searches for a service shop at which the user wants to make an appointment of the date on which to have the purchased car navigator installed.

DETAILED DESCRIPTION OF PREFERRED EMBODIMENTS

Figure 1:
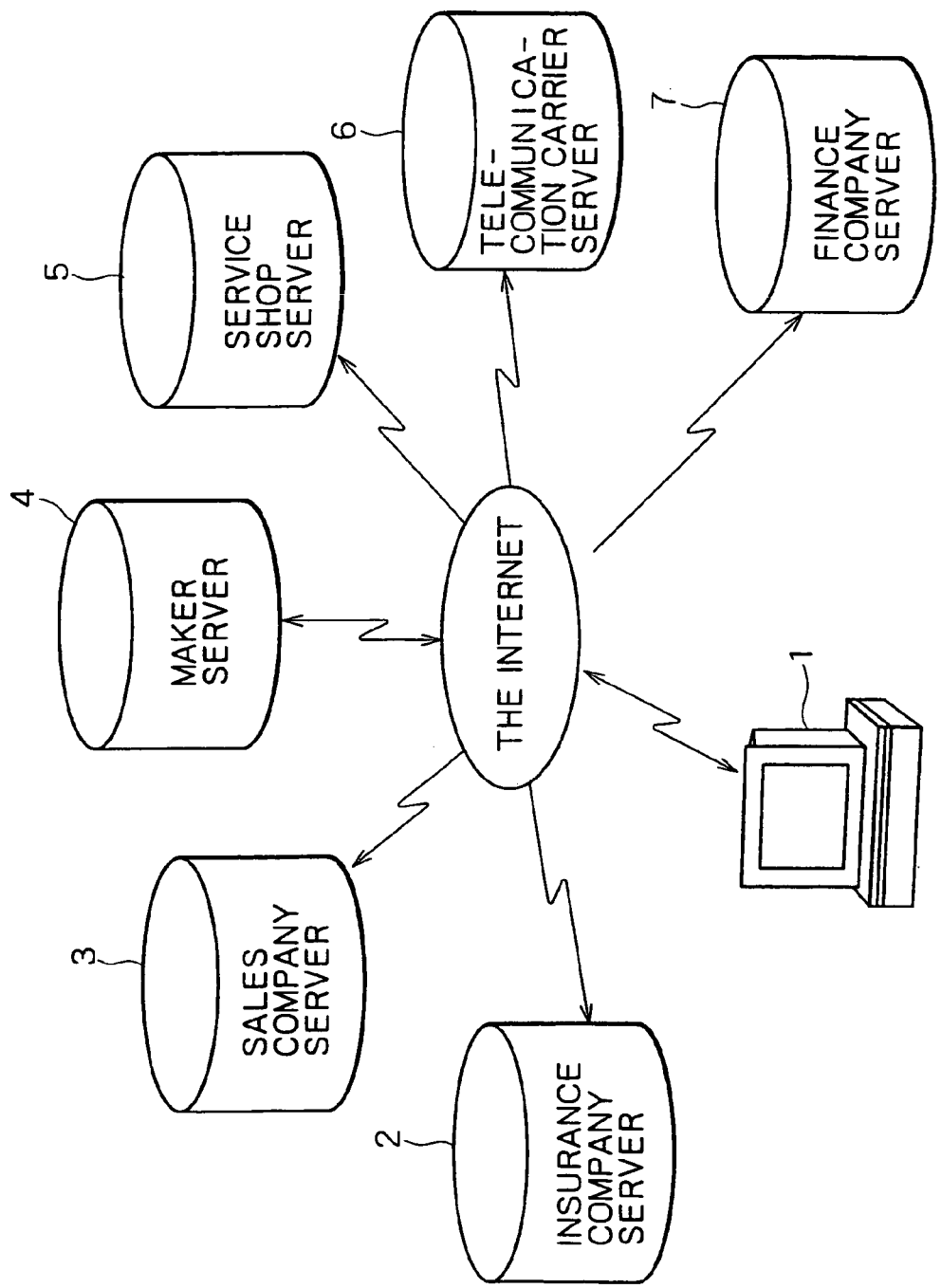
FIG. 1 is a schematic diagram illustrating an overall configuration of a sales system practiced as one embodiment of the invention.

This invention will be described in further detail by way of example with reference to the accompanying drawings. As one embodiment of the present invention, a sales system is used for example in which intangibles are automobile insurance products and tangibles are automobile-associated products, for example, car navigator. The description will be made in the following order:

1. Sales system
1-1 Overall configuration
1-2 User terminal apparatus
1-3 Servers
2. Operational procedure
3. Exemplary Information transfer forms
1. Sales system
1-1 Overall configuration Now referring to FIG. 1, there is shown a exemplary overall configuration of the sales system practiced as one embodiment of the invention. In the figure, a user terminal 1 is a personal computer which can be connected to the Internet. The user terminal 1 is used by a user of this terminal, or customer of the products offered by this sales system. The sales system has at least an automobile insurance company (or insurance company) server 2, a sales company server 3, a maker server 4, a car service shop server 5, a telecommunication carrier server 6, and a finance company server 7.

The insurance company server 2, managed by a particular automobile insurance company, is adapted to provide at least an estimate of automobile insurance and conclude the purchase agreements thereof when the user accesses this server for a purchase order. Namely, the company server 2 is constituted as capable of selling an intangible product such as automobile insurance in an Internet shopping environment.

The sales company server 3 is constituted to sell tangible products; in the present embodiment, car navigators, which are recommended for purchase in combination with automobile insurance as will be described.

If only the realization of the sale of a combination of an intangible such as an automobile insurance product and a tangible such as a car navigation system is intended, the insurance company server 2, the sales company server 3, and the finance company server 7 to be described later may only be arranged. However, the present embodiment additionally has the maker server 4, the service shop server 5, and the telecommunication carrier server 6 in order to provide additional services to the customers of a combination of an automobile insurance product and a car navigation system.

The maker server 4, managed by a maker of tangibles handled by the sales company server 3, accepts the orders of tangibles from the sales company server 3. In addition, the maker server 4 is also constituted to notify, upon request, the sales company server 3 for example of the stock and deliver times of ordered products.

The service shop server 5 provides the information about many car maintenance and service shops which are under contract with the sales system of this embodiment. For example, accessing this server allows the user to search for a service shop at which a car navigation system is installed on the user's car or the appointment of the installation is made.

The telecommunication carrier server 6 is managed by a wireless telecommunication company providing mobile telephony for example. Some of the car navigation systems for sale in the sales system of the present embodiment can be connected to the Internet by use of mobile telephone technologies for example. A user who has determined to buy such a car navigation system accesses the telecommunication carrier server 6 to register the wireless communication unit to be installed on this car navigation system.

The finance company server 7, managed by various finance companies or institutions, allows the user to settle the payment for purchased products.

1-2 User Terminal Apparatus

Figure 2:
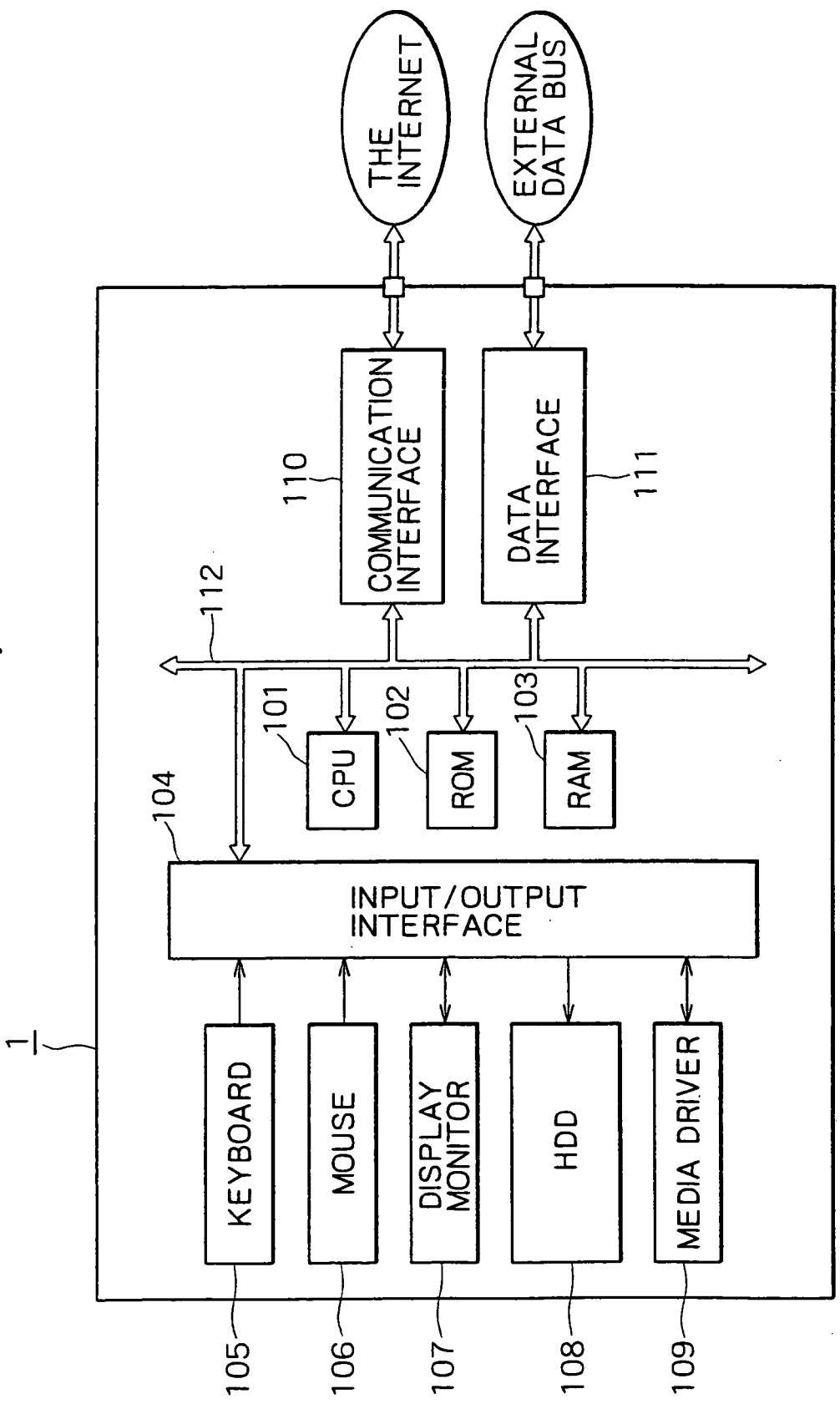
FIG. 2 is a block diagram illustrating an exemplary internal configuration of a user terminal of the sales system of FIG. 1.

Referring to FIG. 2, there is shown a block diagram of an exemplary internal configuration of the user terminal apparatus 1. As described, the user terminal 1 in the present embodiment is a personal computer connectable with the Internet.

In the figure, a CPU 101 executes various processing operations as instructed by programs stored in a ROM 102 for example. A RAM 103 arbitrarily holds data and programs necessary for the CPU 101 to execute various processing operations.

An input/output interface 104 comprises a keyboard 105 and a mouse 106 and outputs the operational signals inputted from these devices into the CPU 101. The input/output interface 104 is also connected to a hard disk drive (HDD) 108 having a hard disk, which serves as a storage medium. The CPU 101 reads and writes data and programs on the hard disk of the HDD 108 through the input/output interface 104. In the present embodiment, the input/output interface 104 is also connected to a display monitor 107.

A media driver 109 is compatible with a particular type of storage medium and reads and writes data thereon.

A communication interface 110 executes communication with the above-mentioned servers via the Internet. For example, this interface is a modem if the connection with the Internet is based on a public switched phone line or the Ethernet if the connection is based on a network.

A data interface 111 provides communication interface with peripheral units. For example, the data interface is SCSI, USB, or IEEE 1394. The driver of the recording medium may also be a peripheral device which is connected to the user terminal apparatus by the data interface 111.

An internal bus 112, based on a PCI (Peripheral Component Interconnect) or local bus, interconnects the functional components inside the user terminal apparatus.

1-3 Servers

Figure 3:
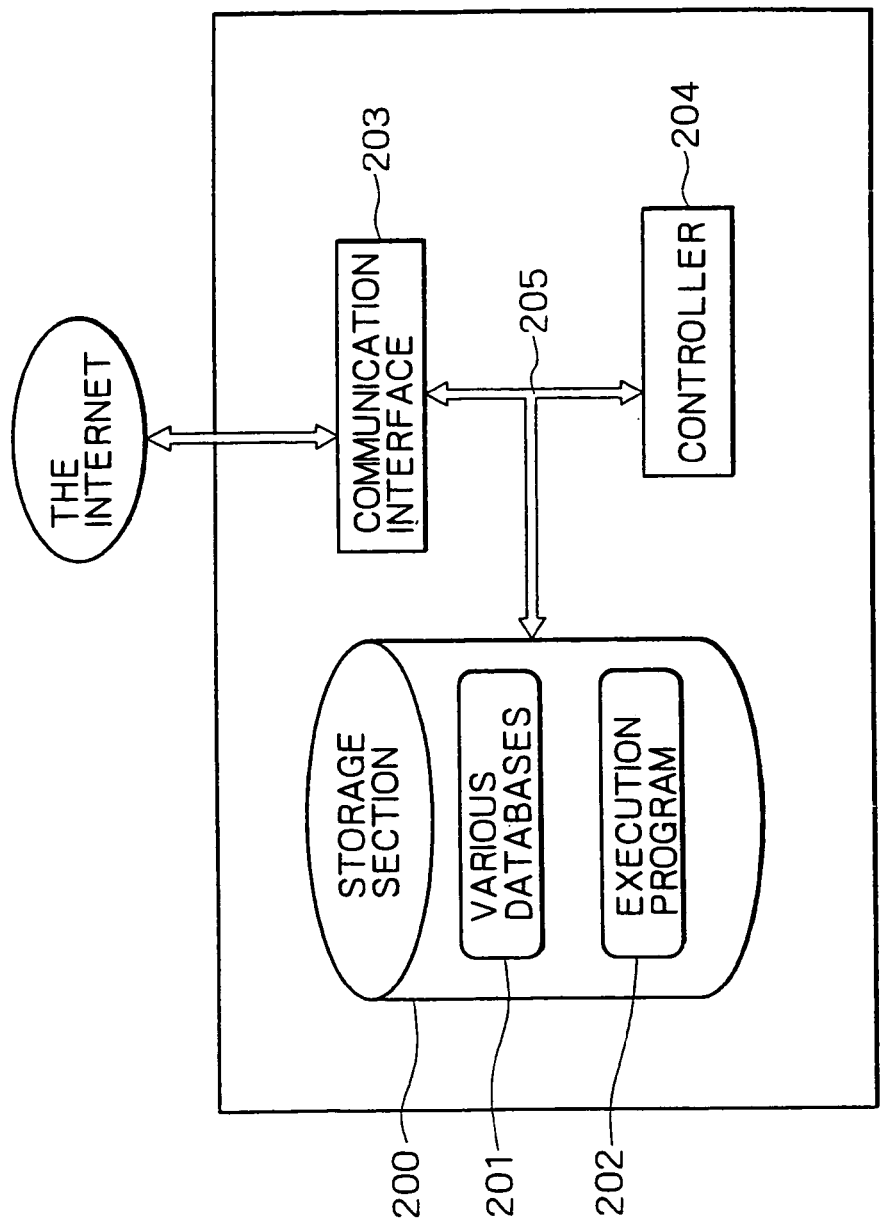
FIG. 3 is a block digram illustrating a basic configuration common to each of servers constituting the sales system of FIG. 1.

The insurance company server 2, the sales company server 3, the maker server 4, the service shop server 5, the telecommunication carrier server 6, the finance company server 7 have each substantially a same hardware configuration, which is as shown in FIG. 3. The server configuration shown in FIG. 3 is based on a storage section 200, a communication interface section 203, and a control section 204.

The storage section 200 stores various information necessary for implementing the functionality of the server. In this example, the storage section 200 stores a database 201 and an execution program 202. The database 201 stores information predetermined for each server. The execution program 202 is executed by the control section 204 of each server.

2. Operational Procedure

Referring to FIGS. 4, 5, 6, 7, 8, 9, 10, 11, 12, and 13, a procedure of the operations to be executed by the user, or a customer of products offered by this sales system, on the user terminal apparatus 1 will be described. These figures are Web browser screens to be shown on the display monitor 107 of the user terminal apparatus 1.

For example, it is assumed here that the user be planning to purchase an automobile insurance product, an intangible. First, the user starts an order program known as a Web browser for browsing Internet sites by performing a predetermined operation, thereby accessing an automobile insurance purchase site in the insurance company server 2 in the sales system of the present embodiment.

Figure 4:
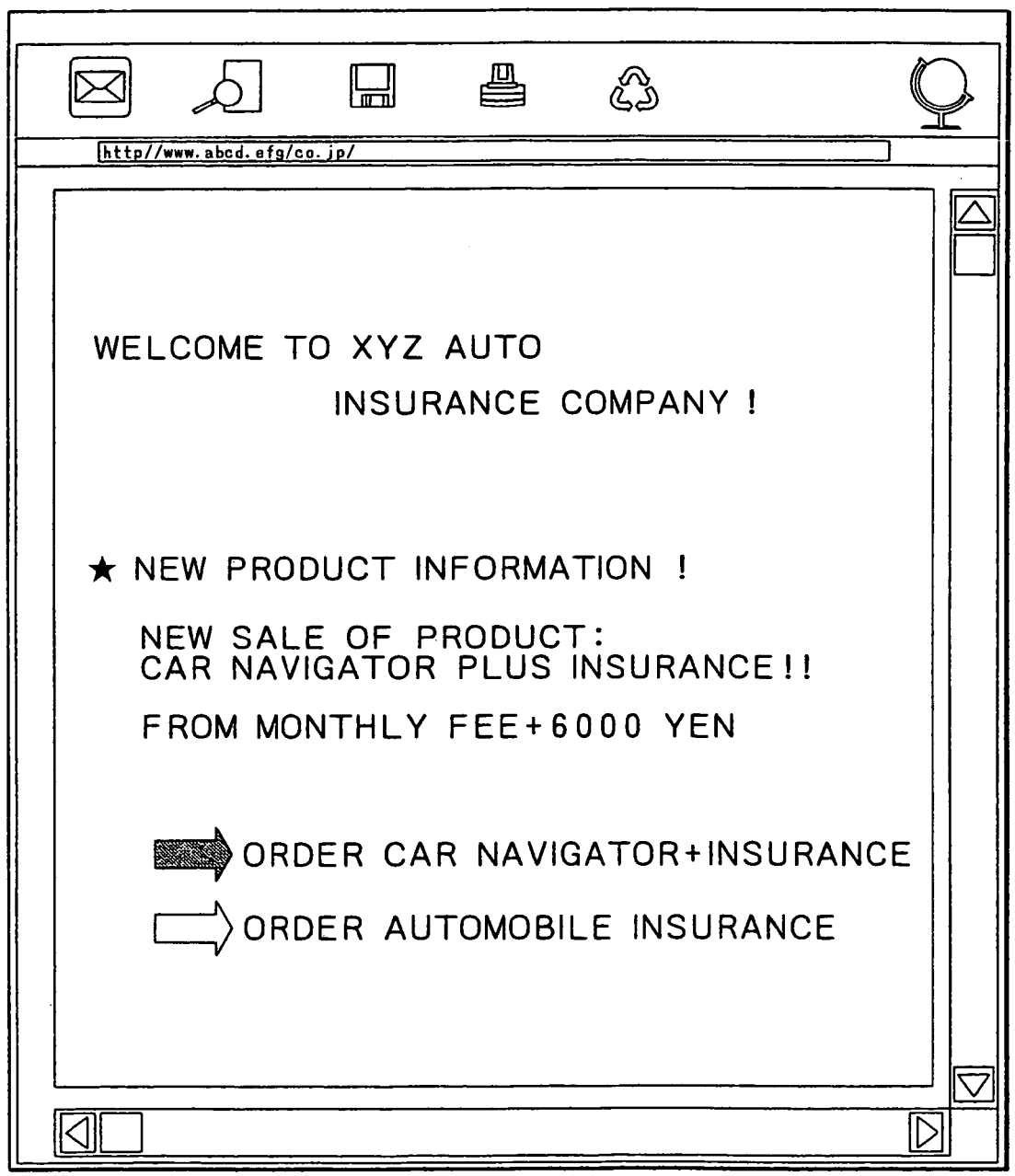
FIG. 4 shows an exemplary top page screen provided by the server, shown on a display monitor of the user terminal of FIG. 2.

Consequently, the top page of the automobile insurance purchase site screen is shown on the display monitor 107 as shown in FIG. 4. This screen presents that the user can purchase a combination of automobile insurance and car navigator. If the user wants to buy both an automobile insurance and a car navigator, he clicks a display area "Order car navigator+insurance" or an arrow shown to the left of this area. If the user wants to buy only automobile insurance, he clicks a display area "Order automobile insurance" or an arrow shown to the left of this area.

For example, the sales system may be adapted so that, if the user buys a combination of automobile insurance and car navigator, the user can get payment merits such as a discount of at least one of products or a discount of split commission as compared with the purchase of only one of the products. Also, the sales system may also be adapted so that the server managing companies can get merits in profit by mutually paying margins of a predetermined ratio at the conclusion of contract.

It is assumed here that the user has clicked display area "Order car navigator+insurance" or "Order automobile insurance," then screens for entering the items necessary for purchasing automobile insurance will be displayed. First, a personal information input screen as shown in FIG. 5 is displayed.

The personal information input screen has boxes for user name, initial, electronic mail address, birthday, age, gender, home address, telephone number, mobile telephone number, occupation, and office address for example. The user sequentially fills these boxes by operating the mouse and keyboard.

Preferably, the personal information input operation should be simplified as far as possible; for example, the age be automatically determined when the birthday is entered and the initial be automatically created when the name is entered.

When the personal information of the user has been all entered, the user click "Next" button in the lower right of the screen. Then an insurance ordering screen shown in FIG. 6 appears.

In the insurance ordering screen, the user enters the items necessary for defining insurance contract. In this example, the user enters such user's car associated information as model name, car number, registration number, model year, and compulsory inspection expiration date. From these items of information, the automobile owned by the user can be identified.

In addition, such insurance-associated information as insurance company of current compulsory automobile liability insurance and certificate number and current voluntary insurance. The information about voluntary insurance includes insurance company name, product name, class, expiration date, certificate number, premium payment form, compensations for bodily injury, property damage, car damage, and passenger bodily injury, and coverage age limit.

It should be noted that the screen shown in FIG. 6 is nothing but general; for example, various other input boxes may be added including presence or absence of automobile safety mechanism and other discount special contract items which affect actual insurance premium setting.

When the user has filled all of the input boxes of the screen shown in FIG. 6 and clicks "Next" button, a car navigator ordering screen shown in FIG. 7 appears if the user selected the purchase of the combination of automobile insurance and car navigator in the top page screen shown in FIG. 4.

The car navigator ordering screen shown in FIG. 7 shows an automobile insurance policy recommended for the user in response to the inputs made in the insurance ordering screen of FIG. 6. In addition, the screen of FIG. 7 shows car navigator purchase box A1 in which the user inputs the information associated with a car navigator to be purchased.

Car navigator purchase box A1 has box A11 indicative of the model number of the car navigator, for example, "NDVD-55SD-1." Car navigator purchase box A1 also has box A12 which asks the user whether to have a service shop install the purchased car navigator. In this example, the user selects the installation by a service shop. To the right of box A12, payment preference box A13 is arranged. In this example, the user selects payment by installments. To the right of box A13, the price of the car navigator is shown.

For the payment by installments, the user can select the number of installments in contract years box. In this example, the payment is made in 3 years. Accordingly, the expiration period of the automobile insurance is automatically set to 3 years.

It should be noted here that the product number, namely, the model of the car navigator shown in box A11 of car navigator selection box A1 is determined as follows.

The information associated with the user's car inputted in the insurance ordering screen of FIG. 6 is sent to not only the insurance company server 2 but also the sales company server 3 for example. On the basis of the supplied car-associated information such as model name and model year, the sales company server 3 searches its database for a car navigator which can be installed on the user's car and displays the product number of the retrieved car navigator in car navigator selection area A1.

Namely, in the present embodiment, on the basis of the information about the automobile insurance, an intangible product, inputted previously, the car navigating system, a tangible product, which is compatible with the user's car is automatically selected and proposed to the user.

Actually, it is possible that two or more car navigator candidates are retrieved. To display two more candidates, box A11 may be constructed as a pull-down menu for example. Alternatively, an independent operational screen page, not shown, may be arranged to display the retrieved car navigators for the user to select one. Such a screen page may be located in the sales company server 3 for example.

In this example, the user can also purchase optional security systems other than car navigators. Accordingly, the car navigator ordering screen has security system purchase box A2. In the security system purchase box, check box A14 is arranged. Checking this box indicates that the user has selected the purchase of a security system. To the left of this check box, box A15 is arranged for specifying whether to have the purchased security system installed for the user. Also, payment preference box A16 is also arranged. To the left of box A16, the price of a proposed security system is shown.

By entering the necessary items in the car navigator ordering screen, the user can get an estimate of the combination purchase of automobile insurance and car navigating system.

When the input operation in the car navigation ordering screen has been completed, the user performs an operation for sending the entered information. To be specific, the user terminal 1 accesses the finance company server 7 to send the information thereto.

On the basis of the received product estimate information, the finance company server 7 executes processing for preparing an actual estimate sheet. Namely, if it is decided that the payment will be made by installments, the amount of each payment is computed from the total amount of purchased products, the interest determined by the number of installments, and so on. When this computation has been completed, the finance company server 7 sends the browser screen data indicative of the obtained estimate to the user terminal 1.

Figure 8:
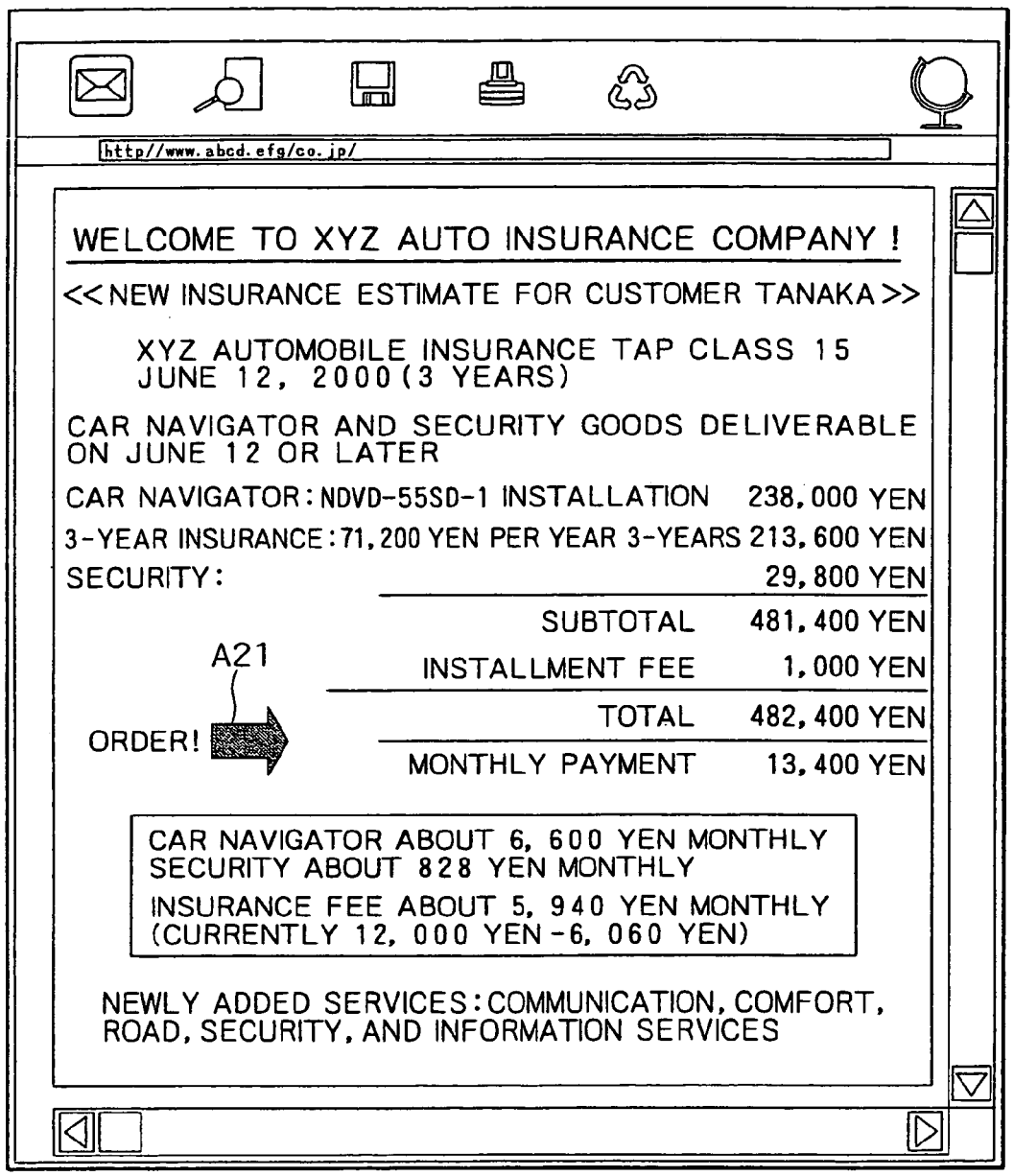
FIG. 8 shows an exemplary estimate sheet screen to be displayed for insurance and car navigator purchase order.

On the basis of the received browser screen data, the user terminal 1 displays an estimate screen as shown in FIG. 8 for example. The user checks the displayed estimate. If the settings made by the user have no error and the user agrees the estimate, then the user clicks "Order!" arrow button A21.

Consequently, the user terminal 1 accesses the finance company server 7 to notify the same of the intention of the purchase in accordance with the presented estimate. In response, the finance company server 7 sends the data of a payment information input screen data as shown in FIG. 9 to the user terminal 1.

Figure 9:
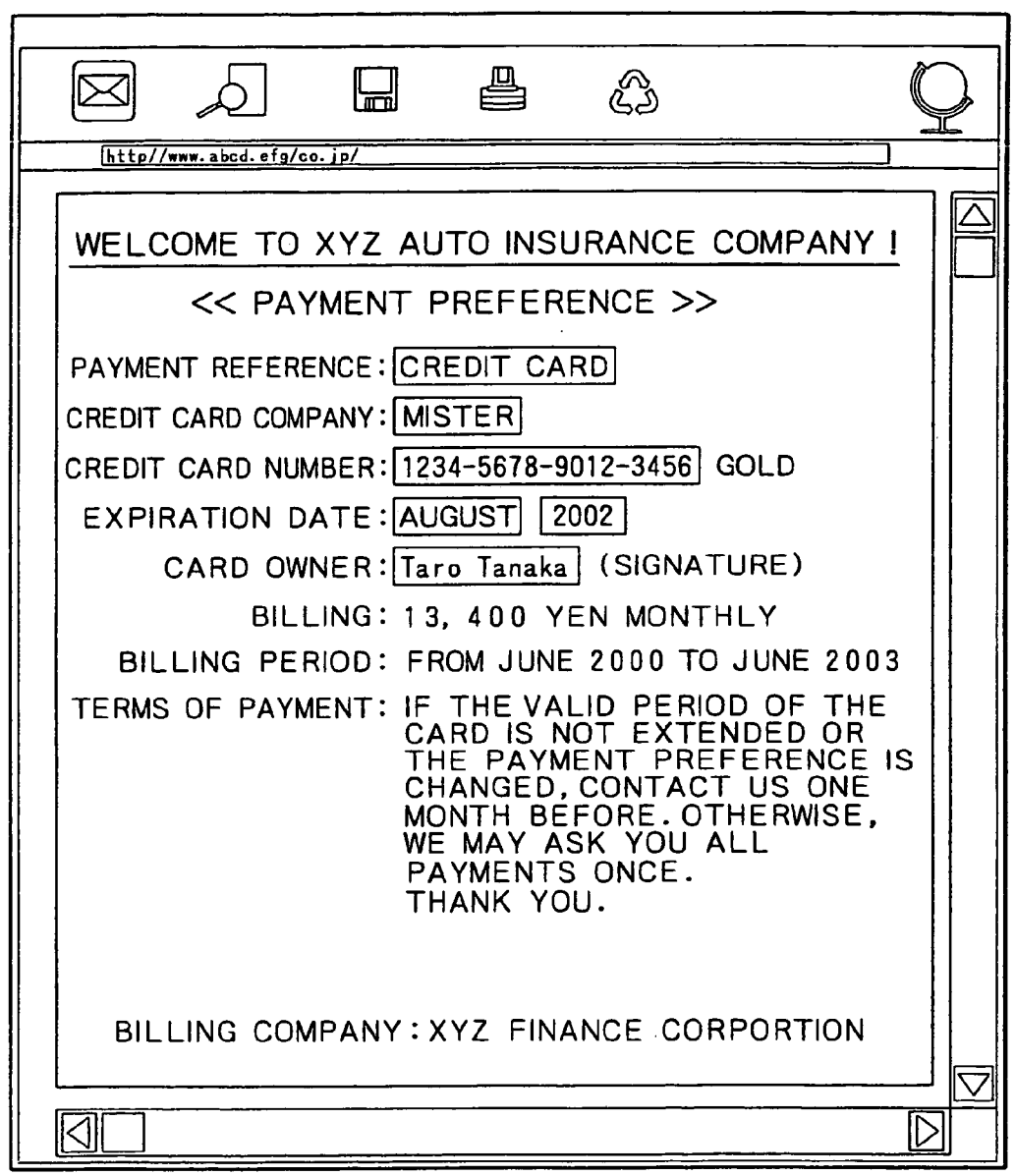
FIG. 9 shows an exemplary payment information screen to be displayed for insurance and car navigator purchase order.

The payment information input screen shown in FIG. 9 has input boxes "Payment preference," "Credit card company," "Credit card number," "Credit card expiration date," "Credit card owner name." The users fills these boxes in accordance with a selected payment preference. The "Payment preference" box is a pull-down menu for example by which the user can selects one of the payment preferences compatible with the present sales system, such as credit card, debit card, bank or postal office debit authorization, and transfer into account.

In this example, the user has selected the payment by credit card. When the user has performed a predetermined operation for the payment, the information thereof is sent to the finance company server 7. This transmission of the payment preference information also indicates the final purchase decision by the user. On the basis of the received payment information, the finance company server 7 executes payment processing in accordance with the contents shown in FIG. 9.

Although not shown, a page screen indicative of the conclusion of the purchase agreements is read by the user terminal 1 and displayed thereon.

Also, upon completion of the payment agreements, the details thereof may be e-mailed to the a mail server for the user.

As described, the operations for determining the purchase of a combination of an automobile insurance product, an intangible, and a car navigating system, a tangible, and for concluding the payment agreements are performed a basic operational flow shown in FIGS. 4, 5, 6, 7, 8, and 9. On the basis of the above-mentioned combination sales of intangibles and tangibles, the present embodiment can provide various other services.

For example, if the car navigating system purchased by the user has a communication terminal for connecting the car navigator to the Internet via a wireless telephone network, the user must contract an agreement about this communication terminal. This contract may be concluded by the user himself after the delivery of the car navigator to the user. In the present embodiment, if the car navigator has the communication terminal at the decision of purchasing the car navigator, the user may also conclude an agreement about the communication terminal through a browser screen.

Figure 10:
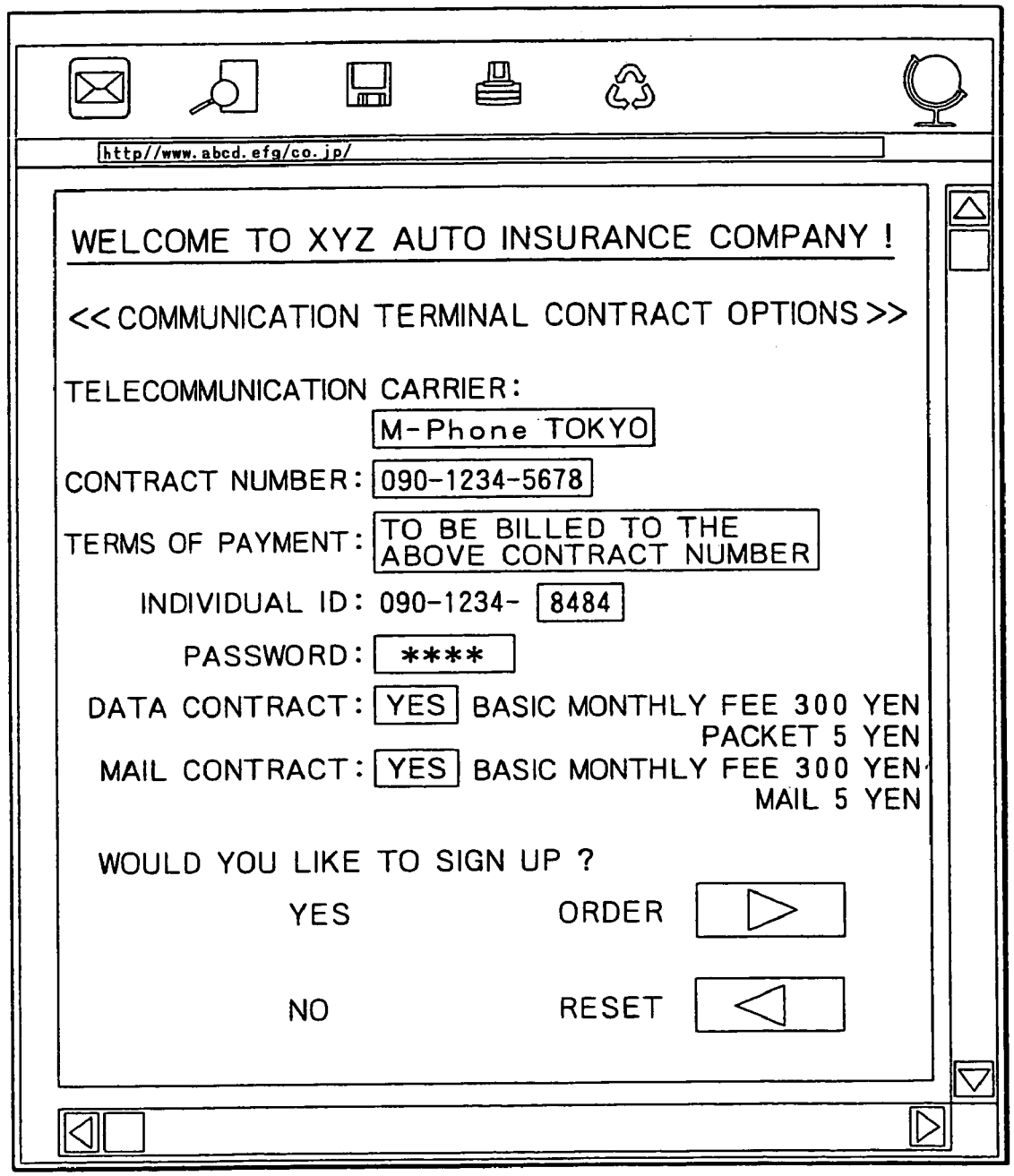
FIG. 10 shows an exemplary communication terminal contract screen.

FIG. 10 shows this browser screen by way of example. If the purchase of the car navigator having the communication terminal was determined in the operation flow shown in FIGS. 4, 5, 6, 7, 8, and 9, the user terminal 1 accesses the telecommunication carrier 6 to display a communication terminal contract screen as shown in FIG. 10.

Filling the boxes in the communication terminal contract screen allows the user to make the registration for communication terminal use services or change or add the contents of the contract. In actually contracting the wireless terminal device, the personal information of the user, such as home address, name, birth day, and so on is required. However, the communication terminal contract screen shown in FIG. 10 has no boxes for entering these items. In the present embodiment, these personal information items need not be entered because the personal information entered in the personal information input screen shown in FIG. 5 is shared between the servers.

When the user performs an operation for the order of the contract, the information about the contract is sent to the telecommunication carrier server 6. At this moment, of the personal information and the information about the car navigator and the user's car entered in the Web browser screens, predetermined data necessary for concluding the communication terminal contract are also sent to the telecommunication carrier server 6. These data may be sent from the user terminal 1 or the data acquired and stored by the sales company server 3 for example accessed so far may be transferred to the telecommunication carrier server 6. On the basis of the received information, the telecommunication carrier server 6 may build a database for example to manage the customers who concluded the contract. Namely, the user's personal information is related to the car navigator as a communication terminal device to be used by that user to perform the charging processing and so on in accordance with a subsequent line usage time and a size of data to be transferred for example.

If the user selected, at the decision of purchasing the car navigator, to have the purchased car navigator installed by a service shop, the user terminal 1 may be made access to the service shop server 5.

The service shop server 5 asks any one of the user terminal 1, the insurance company server 2, and the sales company server 3 for sending the predetermined various information including the personal information inputted by the user for automobile insurance purchase and receives these items of information.

The service shop server 5 has a database storing the data which relate each automobile service shop and each automobile dealer for example under contract with the present sales system with their locations and car models and navigator models in deal for example.

Then, on the basis of the user's home address, car model, and the model of the purchased car navigator for example, the service shop server 5 searches its database for a service shop which is most convenient for the user to have the purchased car navigator installed on his car.

Figure 11:
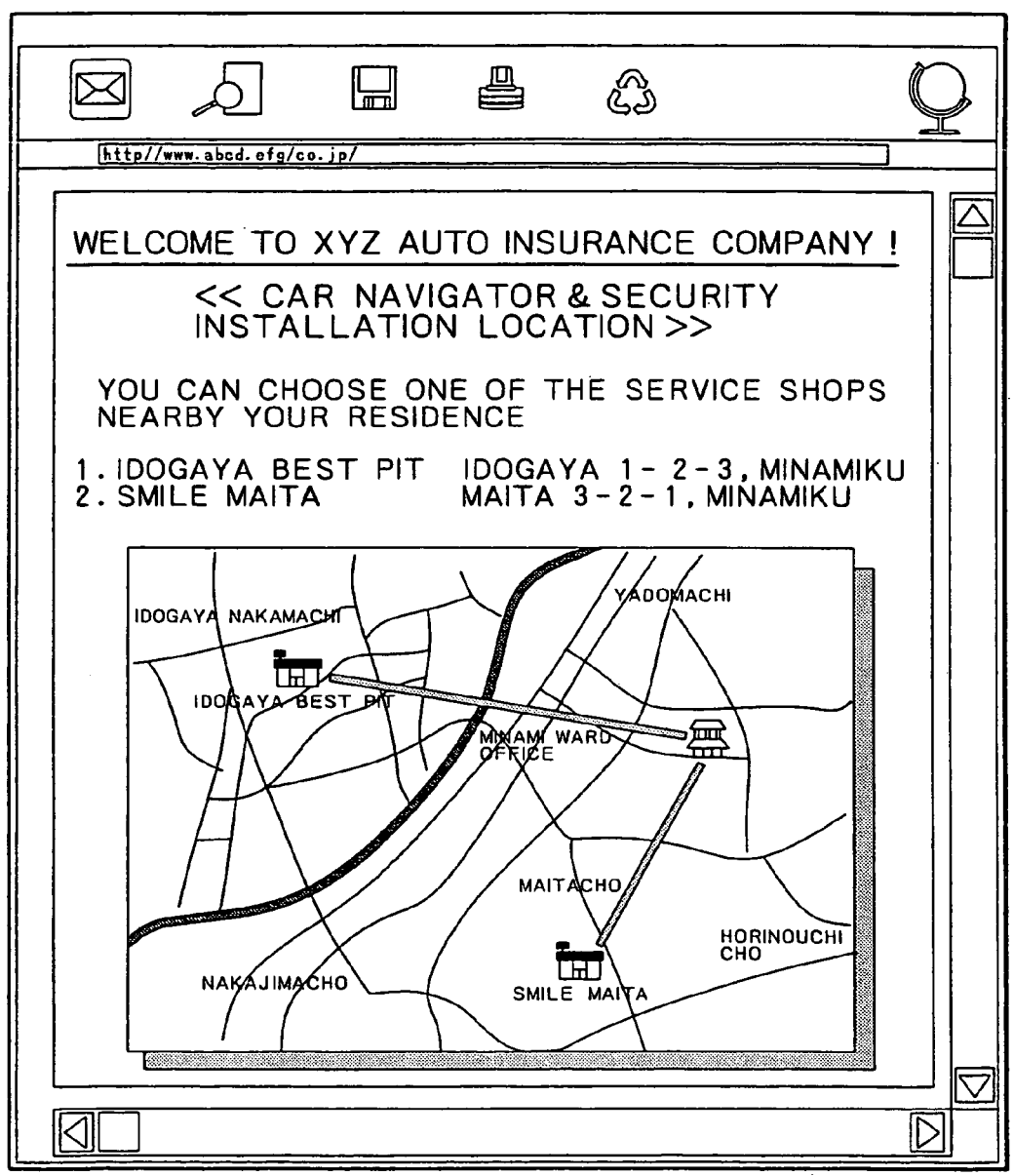
FIG. 11 shows an exemplary service shop map screen.

A result of this search is displayed on the user terminal 1 as shown in FIG. 11 as a service shop guide map screen for example. In this example, the service shops nearest to the user's home are shown in both text and map image. This allows the user to easily understand the positional relationship between the user's home and the service shops.

In order to display the map information as shown in FIG. 11, the service shop server 5 must store the map information in its database. In addition to the displaying of the positional relationships, the service shop server 5 may have capabilities of displaying the distances and routes to the service shops for example. Further, the service shop server 5 may display the times required to reach the service shops on the basis of the accumulated road congestion data for example.

Figure 12:
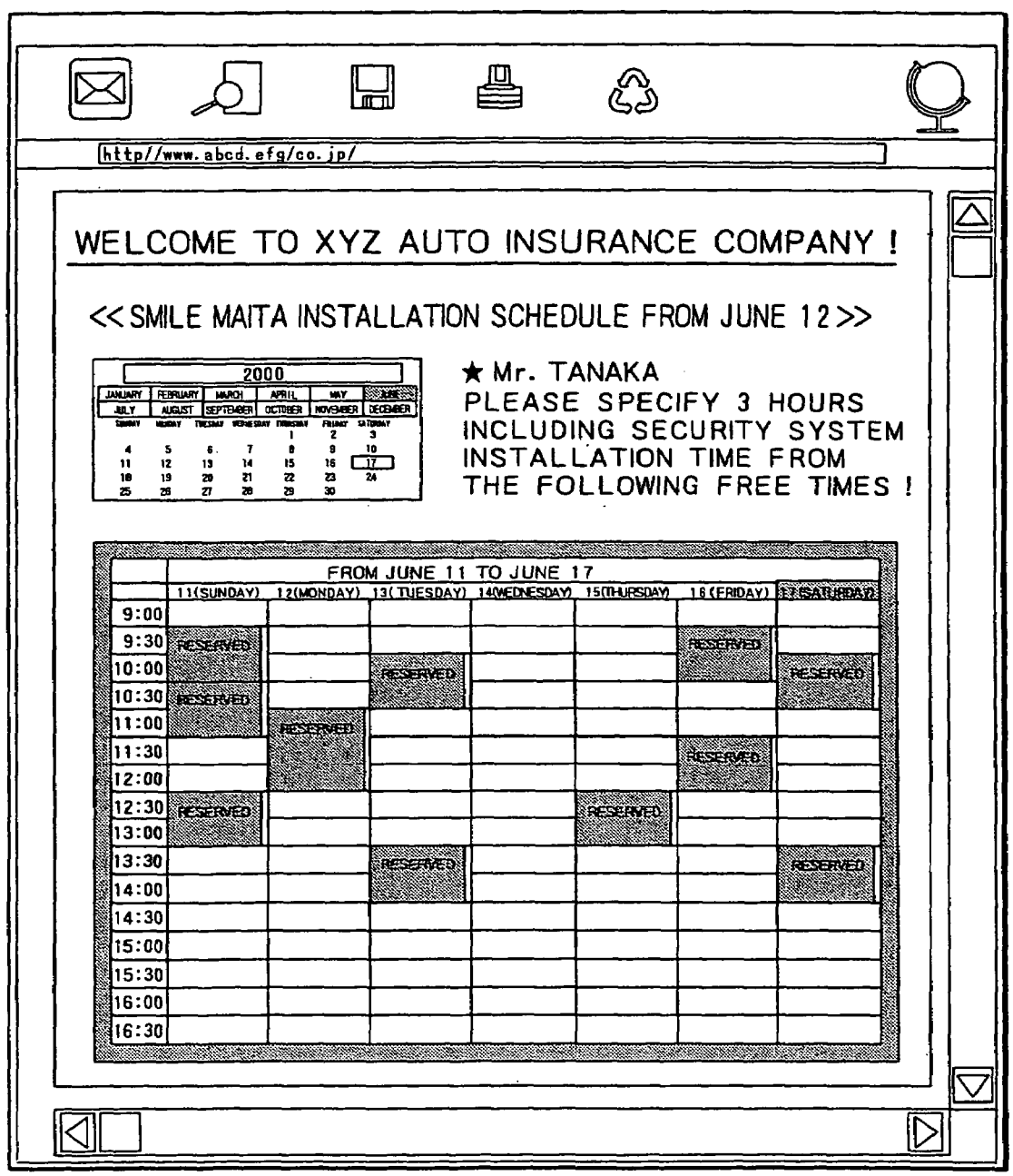
FIG. 12 shows an exemplary car navigator installation schedule appointment screen.

In the present embodiment, service shop candidates are presented as shown in FIG. 11 and another page as shown in FIG. 12 may be accessed. Shown in FIG. 12 is a car navigator installation schedule appointment screen, indicating an appointment status of a service shop selected from among the candidates by the user. In order to implement these display screens, the service shop server 5 collects appointment status information from each service shop under contract and stores the collected data in the database.

Checking the presented appointment schedule of the selected service shop, the user can specify an available day to make an appointment of the installation of the purchased car navigator on his car.

If there exists no available day, the user can return to the service shop guidance screen shown in FIG. 11 and selects the other service shop.

In addition, a cancel standby status may be displayed when the user next accesses the appointment status screen or the standby status may be e-mailed to the user.

Figure 13:
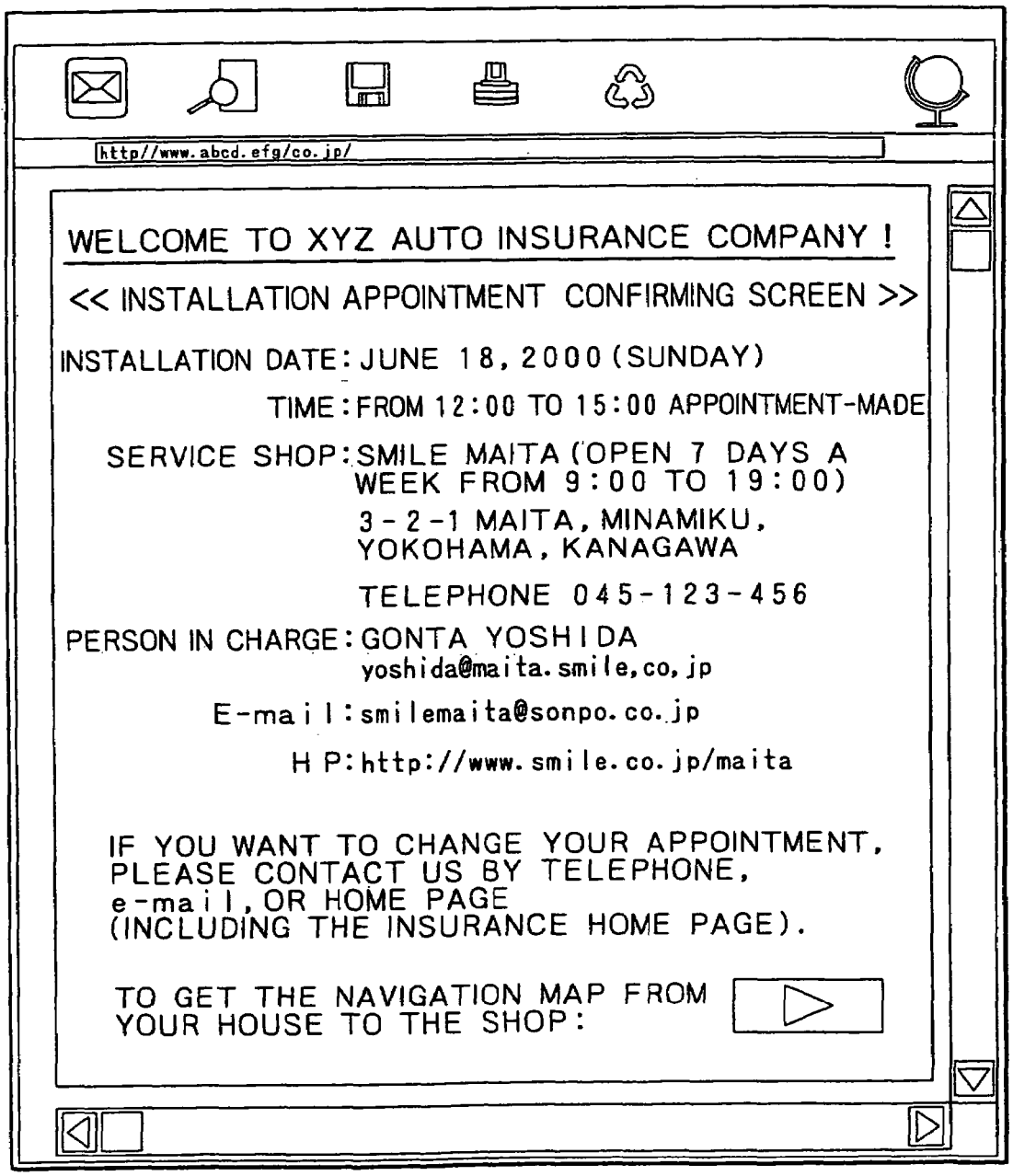
FIG. 13 shows an exemplary car navigator installation appointment confirming screen.

When the user can make an appointment of the installation date, an appointment confirming screen as shown in FIG. 13 is displayed. In this example, the user can get a map indicative of a route from user's home to the service shop by performing a predetermined operation. For example, when the user clicks the map request button shown in FIG. 13, the service shop server 5 sends map information to the user terminal apparatus 1 by electronic mail.

3. Exemplary Information Transfer Forms

In order to implement the above-mentioned operations of the sales system according to the invention as described, the predetermined information is transferred between the user terminal apparatus 1 and each of the servers constituting this sales system and, on the basis of the transferred information, each server executes predetermined processing.

Therefore, the following describes the contents of the information to be transferred in accordance with each of the above-mentioned operations and the operations of the user terminal apparatus 1 and each server to be executed in accordance with the transferred information. It should be noted that, in what follows, the operations of the user terminal apparatus 1 and each server to be executed as data transfer is executed are described; of these operations, the operation to be executed by the user terminal apparatus 1 is executed by the CPU 101 on the basis of the contents of file description in the content data written in HTML for example sent from each server. The operation of each server is executed by its control section 203 as instructed by the execution program 202 stored in the storage section 200.

Figure 14:
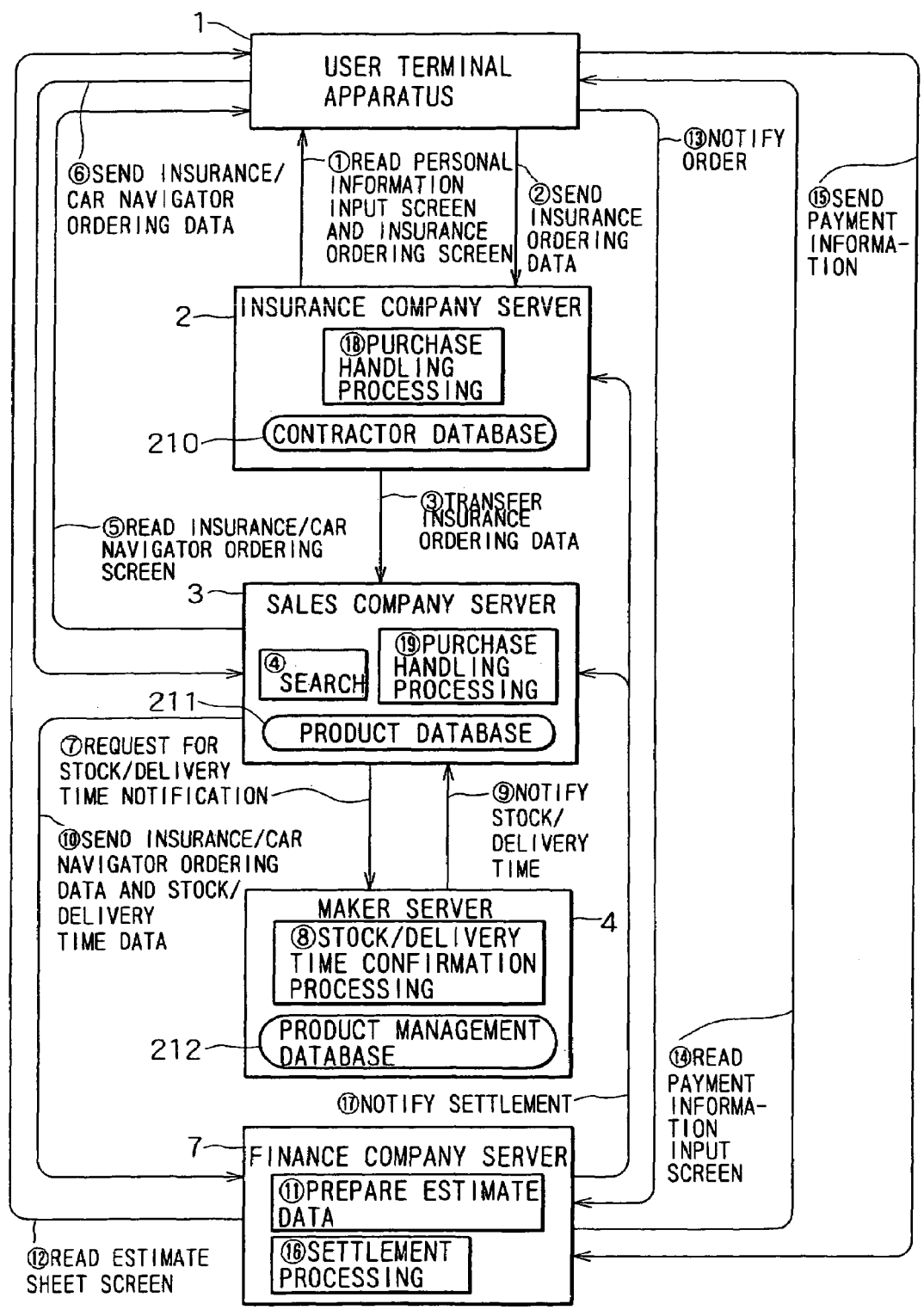
FIG. 14 is a diagram describing the information transfer between the user terminal and the servers of the sales system of FIG. 1 which takes place when the user purchases a combination of automobile insurance and car navigator.

Referring to FIG. 14, there is shown the information to be transferred between the user terminal apparatus 1 and each server when the combination purchase of an automobile insurance product and a car navigator is performed in the sales system according to the invention as described with reference to FIGS. 4 through 9. In the figure, each circled number indicates a basic sequence in the information transmission procedures. In what follows, the description will be made in accordance with these basic sequences.

Procedure 1:

The user terminal apparatus 1 accesses the insurance company server 2 to go from the top page shown in FIG. 4 to the personal information input screen shown in FIG. 5. Further, the user terminal apparatus 1 can shift from the personal information input screen to the insurance ordering screen shown in FIG. 6. Namely, the user terminal apparatus 1 can read the content data of the personal information input screen shown in FIG. 5 and the insurance ordering screen shown in FIG. 6 from the insurance company server 2 and displays these data on the display monitor 107 as browser screens.

Procedure 2:

The user performs the operations of information entry into the personal information input screen shown in FIG. 5 and the insurance ordering screen shown in FIG. 6. The user terminal apparatus 1 sends the inputted personal information and insurance detail information to the insurance company server 2 as the "insurance ordering data."

Procedure 3:

The insurance company server 2 stores the received insurance ordering data as order information. Then, the insurance company server 2 transfers the insurance ordering data to the sales company server 3.

Procedure 4:

The contents of the insurance order information transferred to the sales company server 3 are the input items shown in FIGS. 5 and 6. Therefore, this information includes the detail information about user's car such as model name, model year, and vehicle type for example.

The sales company server 3 has a product database 211 storing the data about the products for sale as shown in FIG. 14. For car navigating systems, the product database 211 includes the information about each vehicle type on which a particular car navigator can be installed.

By use of the vehicle type information contained in the insurance order information as a search key, the sales company server 3 searches the product database 211 for a car navigator which can be installed on the user's car. If required, the sales company server 3 may search for a security system which can be installed on the user's car.

Procedure 5:

When the user has performed a predetermined operation for sending the insurance ordering data in procedure 2, the user terminal apparatus 1 accordingly accesses the linked sales company server 3 to read the insurance and car navigator ordering screen page shown in FIG. 7 from the sales company server 3.

The data of this insurance and car navigator ordering screen page presents one or more car navigating systems retrieved in procedure 4 along with the details of the ordered insurance product. In order to allow the user to select a desired car navigator, script description and external reference files are attached to the HTML file for example of the insurance and car navigator ordering screen.

Procedure 6:

The user terminal apparatus 1 allows the user to order a car navigator and, if necessary, a security system along with an automobile insurance product by performing a predetermined operation through the insurance and car navigator ordering screen shown in FIG. 7. When the user has filled the input information boxes in the screen, the user terminal apparatus 1 sends the inputted information to the sales company server 3 as the insurance and car navigator ordering data.

Procedure 7:

Receiving the insurance and car navigator ordering data, the sales company server 3 recognizes that the user has ordered both automobile insurance and car navigator. However, at this stage of processing, the confirmation of the final order has not been made. In this example, the sales company server 3 first communicates with the maker server 4 to request the same for a stock and delivery notification in order to confirm the stock and delivery of the tangible product ordered by the user, namely a car navigator or a security system. In the request, the sales company server 3 sends a command for requesting the stock and delivery notification along with the product ID of the car navigator.

Procedure 8:

The maker server 4 registers the information about stock status and delivery status of each product handled as an article for sale in the sales company server 3 and stores the registered information in its product management database 212. In this example, the product management database 212 stores the information about the current stock status of the car navigating systems manufactured by that maker.

Receiving the stock and delivery notification request in procedure 7, the maker server 4 searches the product management database 212 for the car navigator having the specified product ID to provide the current stock and delivery status of that product, namely the car navigator ordered by the user. Likewise, the maker server 4 obtains the stock and delivery status of the security system ordered by the user.

Procedure 9:

The maker server 4 sends back the stock and delivery status notification of the car navigator or the security system to the sales company server 3.

Procedure 10:

Receiving the stock and delivery status notification, the sales company server 3 sends the insurance and car navigator ordering data received in procedure 6 and the stock and delivery data received in procedure 9 to the finance company server 7. These data provide the information necessary for preparing an estimate sheet.

Procedure 11:

Based on the received issuance and car navigator ordering data and stock and delivery status data, the finance company server 7 prepares estimate sheet data. Namely, on the basis of the insurance and car navigator ordering data, the finance company server 7 obtains a total amount of the automobile insurance and the car navigator or security system. Then, in accordance with the payment preference selected by the user, the finance company server 7 executes estimate processing. For example, if the payment by credit card is specified by the user, the finance company server 7 obtains the amount of payment to be made every month for example on the basis of the interest, the number of installments, and the split payment commission prescribed by that credit card company. Thus, the finance company server 7 obtains the predetermined information necessary for estimate sheet preparation. Finally, the use of these items of information, the finance company server 7 creates the data for the estimate sheet screen shown in FIG. 8 for the user.

Procedure 12:

When the user terminal apparatus 1 has sent the insurance and car navigator ordering data in procedure 6, the user terminal apparatus 1 is controlled to access the finance company server 7. Then, the user terminal apparatus 1 reads the estimate sheet screen page created in procedure 11. Consequently, the estimate sheet screen shown in FIG. 8 is displayed on the user terminal apparatus 1.

Procedure 13:

In the estimate sheet screen shown in FIG. 8, the user checks the contents of the estimate and, if the user agrees with it, clicks "Order!" button A21. When this button is clicked, the user terminal apparatus 1 sends an order notification to the finance company server 7.

Procedure 14:

After sending the order notification, the user terminal apparatus 1 reads the payment information input screen shown in FIG. 9 provided by the finance company server 7.

Procedure 15:

Then, the user fills the boxes of the payment information input screen shown in FIG. 9 on the user terminal apparatus 1 and sends the payment information about the user's credit card for example to the finance company server 7. The transmission of this information is regarded by the finance company server 7 as the user's final ordering decision.

Procedure 16:

On the basis of the received payment information as the final ordering decision by the user, the finance company server 7 executes required payment settlement processing. At this point of time, the purchase contract for the automobile insurance and car navigator or security system ordered by the user has been established.

Procedure 17:

Then, the finance company server 7 sends a payment settlement notification to the insurance company server 2 and the sales company server 3. Namely, the finance company server 7 sends the user ID or user's personal information for identifying the user and the establishment of the purchase contract for the automobile insurance and car navigator or security system ordered by the user.

Procedure 18:

Receiving the payment settlement notification, the insurance company server 2 executes required purchase handling processing. Namely, the insurance company server 2 registers the user with a contractor database 210 as an authorized contractor. Subsequently, on the basis of the information registered with the contractor database 210, the corresponding insurance company prepares and sends an insurance policy for example to the user.

Procedure 19:

Likewise, receiving the payment settlement notification, the sales company server 3 executes the purchase handling processing for the car navigator or security system purchased by the user. For example, the sales company server 3 orders the car navigator or security system purchased by the user to the maker server 4.

Although not shown, after the conclusion of the purchase contract as described above, a page screen data indicative that the procedure for the purchase contract has been properly ended may be sent to the user terminal apparatus 1 from any one of the insurance company server 2, the sales company server 3, and the finance company server 7. In addition, any one of the insurance company server 2, the sales company server 3, and the finance company server 7 may representatively e-mail the details of the purchase contract to the mail server of the user. The mail address of the user is inputted as one item of the personal information as shown in FIG. 5. The server to send the electronic mail uses this mail address.

Now, referring to FIG. 15, there is shown a flow of data which takes place when, if the car navigator ordered by the user has a wireless communication terminal device, the user signs a contract on wireless communication with a telecommunication carrier, in the processing shown in FIG. 14 for example. This data flow corresponds to the communication terminal contracting screen shown in FIG. 10. In FIG. 15, the data transmission procedures are also shown in circled numbers.

Procedure 1:

For example, if the user decides to purchase a car navigator having a wireless communication terminal capability, the user terminal apparatus 1 accesses the telecommunication carrier server 6 by following a link between the HTML file of the currently displayed screen and the server 6 in accordance with the description of the content data of that HTML file. Then, the user terminal apparatus 1 reads the communication terminal contract screen shown in FIG. 10 from the telecommunication carrier server 6.

Procedure 2:

The user fills the boxes for inputting required contract information in the communication terminal contract screen as described with reference to FIG. 10. The user terminal apparatus 1 sends the inputted contracting information to the telecommunication carrier server 6 as the communication contract data.

Procedure 3:

On the basis of the received communication contract data, the telecommunication carrier server 6 executes contract processing. First, the telecommunication carrier server 6 registers the received contract data with its communication contract database 213. This registration requires the personal information such as user's name and address and the information such as an ID for identifying a car navigator on which the wireless terminal device is to be installed. These items of information may be obtained from the personal information inputted in the personal information input screen when the automobile insurance was ordered. Therefore, it is assumed that these items of information be included in the communication contract data.

Procedure 4:

Next, the telecommunication carrier server 6 transfers the received communication contract data to the sales company server 3.

Procedure 5:

The sales server 3 selects the maker server 4 which manufactures and stocks the car navigator purchased by the user and transfers the communication contract data to the maker server 4.

Procedure 6:

On the basis of the communication contract data received from the telecommunication carrier server 6 via the sales company server 3, the maker server 4 executes the registration of the wireless terminal device of the car navigator. Namely, the maker server 4 selects the one of the car navigators to be sold to the user at this stage of processing. In other words, the maker server 4 determines the ID of a particular navigator, such as its serial number, among the navigators of a same model. Then, the maker server 4 registers the ID including a telephone number with the communication terminal device to be installed on the selected car navigator in accordance with the received communication contract data. This registration data is stored in the product management database 212. At the shipment from factory for example, the registration of the telephone number is written to the communication terminal device from the product management database 212.

Thus, the wireless terminal device of the car navigator purchased by the user is registered.

The processing flow for the appointment of car navigator installation shown with reference to FIGS. 11 and 12 is as shown in FIG. 16.

Procedure 1:

If the user decides the purchase of a car navigator through a browser screen, the user terminal apparatus 1 accesses the service shop server 5 in accordance with a content data command for example. Then, the user terminal apparatus 1 requests the service shop server 5 to supply service shop map screen data as shown in FIG. 11 for example.

Procedure 2:

Receiving the request from the user terminal apparatus 1, the service shop server 5 captures the insurance ordering data of the user from the insurance company server 2. However, this processing of procedure 2 may have been executed before to have the service shop server 5 hold the captured insurance ordering data in advance.

Procedure 3:

The service shop server 5 has a shop location database 215 and an appointment schedule database 216. The service shop server 5 first searches the shop location database 215 for the service shops nearest to the user on the basis of the insurance ordering data obtained as described above.

The shop location database 215 holds the information about the locations of the service shops under contract with the sales system associated with the present invention, in the form of a map. This database also holds the car models which can be handled by each service shop and the makers and models of the compatible car navigators for example.

By use of the home address and car model for example included in the insurance ordering data as search keys, the controller of the service shop server 5 searches the database for 215 for the service shops nearest to the user and capable of installing the car navigator purchased by the user on the user's car.

Procedure 4:

On the basis of a result of the search performed in procedure 3, the service shop server 5 creates a service shop map screen as shown in FIG. 11, which is read by the user terminal apparatus 1.

Procedure 5:

The service shop map screen is displayed on the user terminal apparatus 1. The user selects a desired service shop from among those displayed on the screen. When the user has selected one, the information specifying the selected service shop is sent to the service shop server 5.

Procedure 6:

The appointment schedule database 216 stores the current appointment status of each service shop under contract with the present sales system. Receiving the service shop specification information, the service shop server 5 searches the appointment schedule database 216 for the appointment schedule data of the specified service shop. By use of the retrieved appointment schedule data, the service shop server 5 creates an installation schedule appointment screen as shown in FIG. 12.

Procedure 7:

The user terminal apparatus 1 reads and displays the content data of the installation schedule appointment screen.

Procedure 8:

Checking the displayed installation schedule appointment screen, the user can make an appointment of a day on which to install the purchased car navigator on the car. The selected appointment date is sent to the service shop server 5 as the appointment data.

Procedure 9:

On the basis of the received appointment data, the service shop server 5 creates the data about an installation appointment confirming screen as shown in FIG. 13. The service shop server 5 sends the created data to the user terminal apparatus 1. The user terminal apparatus receives the data and displays the installation appointment confirming screen.

It should be noted that, because the information transferred in the above descriptions, such as the user's name, address, and credit card number is confidential to any third party, it is encrypted and transmitted/received for security.

According to the embodiment described so far, the user can receive the following services from the present sales system via the Internet:

1. The estimate and purchase of an automobile insurance product, which is an intangible product;
2. The estimate and purchase of a car navigating system and/or a security system, which are tangible products;
3. The recommendation of nearest service shops for installing the purchased navigator on the user's car and the appointment of installation date; and
4. The contract of a wireless terminal device to be installed on the purchased car navigator.

In the present embodiment, on the basis of the insurance ordering data inputted by the user, the sales side can recommend car navigating systems suitable for the user's car. Namely, by use of the information inputted by the user for the purchase of any one of tangible and intangible products, this sales system can offer the chance for the user to purchase the other product. Consequently, when ordering two different forms of products, namely intangible products and tangible products, the user is required to input his personal information and the product selecting information such as car model for example only once. Once these items of information have been inputted, the user need not input them again for the purchase of the other form of product, which saves the user a lot of time and labor.

The recommendation of nearest service shops at which the user can install the purchased car navigator and/or security system on his car is also executed by use of the user's home address and car model for example included in the insurance ordering data inputted beforehand, thereby making it unnecessary for the user to enter the information again for the search for nearest service shops.

Further, the contracting a wireless terminal device to be installed on the purchased car navigator can also be performed by use of the user's personal information included in the insurance ordering data inputted beforehand. The communication terminal contract screen shown in FIG. 11 saves the user of the number of information items to be inputted as compared with related-art techniques.

As described, the sales system of the present embodiment of the invention is intended to ask a user who purchases a tangible and an intangible to enter necessary information only once for either of the products and use the information thus inputted for the purchase of other product to save the user time and labor. In other words, the sales system according to the present invention can positively offers various services by simplifying the procedure for purchasing them by the reuse of the information inputted once for the initial purchase of two or more tangible and intangible products. Further, the sales system according to the present invention can add other servers than those described above for additional services if they can be offered by the reuse of the information once inputted.

In addition, the sales system according to the present invention is also characterized as follows.

For example, when the user receives various services as described above, the user terminal apparatus 1 accesses not only the insurance company server 2 but also other servers such as the sales company server 3, the maker server 4, and service shop server 5, the telecommunication carrier server 6, and the finance company server 7. Namely, the user terminal apparatus 1 accesses the servers of different business forms and institutions. However, as seen from the descriptions made so far, these servers are cooperatively integrated into one sales system to be displayed on the browser screens shown in FIGS. 4 through 13. Consequently, the user operating the user terminal apparatus 1 can process the ordering of the purchase of a combination of tangible and intangible products, the payment settlement for the purchase, the appointment of the date of car navigator installment, the contracting a wireless terminal device to be installed on the car navigator, and other services by only a single operational flow without being aware of the access to the different servers.

The above-mentioned operational procedures and the operations which takes place in the sales system associated with the present invention in response to these operational procedures are for an illustrative purpose only. Actually, system operations which flexibly corresponds to the operations performed by the user take place. For example, the network site which the user accesses first is not limited to the insurance server 2. The user may first access the sales company server 3 to check the stock and delivery status of a desired car navigator, access the service shop server 5 to check to see if the user can have his car navigator installed on a desired day, and then access the insurance server 2 for finally ordering automobile insurance.

It will be apparent to those skilled in the art that the present invention is not limited to the above-mentioned embodiment. The combination sales of tangible and intangible products is not limited to the above-mentioned automobile insurance and car navigator and/or security system. If there is any correlation between tangible and intangible products, the types of combination sales may be determined by the management side of the sales system. If the combinations of tangibles and intangibles offered for sale change as a result of the determination, the services accompanying the combination sales change necessarily. Therefore, the servers constituting the sales system may be changed accordingly.

In the above-mentioned embodiment, tangible products are selectively determined after ordering an intangible product. Conversely, tangible products may be selectively determined before ordering an intangible product.

As described and according to the invention, the user may only enter purchase order information for ordering an intangible product for example in purchasing a combination of tangible and intangible products associated with each other via a network. For example, when the user enters purchase order information for purchasing an intangible product, the associated tangible product candidates are automatically displayed for the user. To be more specific, for example, when purchasing a combination of tangible and intangible products, the user may only accesses the sales site of intangible products to order a desired intangible product; the user need not access any site for selling tangible products and enter the information necessary for purchase.

Consequently, the present invention significantly saves the user time and labor in purchasing a combination of tangible and intangible products. Also, because the selected product candidates are automatically displayed by the server side, the user need not be aware of the change of the servers constituting the sales system if any.

Namely, the present invention provides advantages that the purchase orders for tangibles and intangibles can be handled in a unified manner on the basis of a simplified user operational procedure, or single information provision. Conventionally, the user who wants to purchase a combination of tangible and intangible products must take the trouble of following the links to a site selling intangible products and then a site selling tangible products, for example, entering the information necessary for the purchase at every site accessed.

In addition, service providing servers may also be added to the sales system according to the invention for providing the services associated with any of tangible and intangible products for combination purchase offers. These service providing servers also realize their service provision by communicating with user terminals on the basis of the purchase order information inputted in these user terminals. Consequently, the user may input the purchase order information only once and therefore need not input the same information for any additional purchase activities, receiving the service provision in a simplified operational procedure.

Thus, according to the present invention, the product purchase and accompanying service provision via a network can be performed with a minimum necessary information input procedure, thereby eliminating the conventional complexity in information input operations to significantly enhance the user friendliness of network sales systems. Further, the present invention allows the servers constituting the sales system according to the invention to share the purchase order information inputted by the user of each user terminal, thereby facilitating the expansion of services for the users.

While the preferred embodiments of the present invention have been described using specific terms, such description is for illustrative purposes only, and it is to be understood that changes and variations may be made without departing from the spirit or scope of the appended claims.

What is claimed is:

1. A cooperative sales system interconnected via a network for selling an intangible product and for selling a tangible product, said sales system comprising:
   a user terminal apparatus connected to the network; and
   a plurality of servers, including:
   an intangible product sales server connected to the network for carrying out a sale of the intangible product,
   a tangible product sales server connected to the network for carrying out a sale of the tangible product,
   a tangible product manufacturer server connected to the network and having a tangible product database for storing availability and delivery time data about the tangible product, and
   a finance company server;
   said user terminal apparatus including:
   operator means for receiving inputs provided by a user,
   terminal communication means for transmitting data to and receiving data from said plurality of servers,
   display means for displaying the data received by said terminal communication means, and
   terminal control means for controlling said communication means to receive data from at least one of said plurality of servers, for controlling said display means to display the received data, and for controlling said communication means to transmit inputted data that is provided by the user in response to the received data displayed by said display means;
   said intangible product sales server including:
   intangible server communication means for transmitting data to and receiving data from other devices connected to the network,
   intangible product data storage means for storing data about the intangible product,
   intangible server user information storage means for storing personal data about the user, and
   intangible server control means for controlling said intangible server communication means to transmit first display data to said user terminal apparatus, the first display data including requests for the user to provide personal data about the user and to provide ordering data about the intangible product, for controlling said intangible server communication means to receive user-provided personal data about the user and to receive user-provided ordering data about the intangible product from said user terminal apparatus, and in response to receiving the user-provided personal data and the user-provider ordering data, for searching said intangible product data storage means to retrieve information about the intangible product based on the received ordering data about the intangible product, for controlling said intangible server user information storage means to store the received personal data about the user, for controlling said intangible server communication means to transmit at least some of the received personal data about the user and at least some of the received ordering data about the intangible product to said tangible product sales server, and for controlling said intangible server communication means to transmit the retrieved information about the intangible product to said user terminal apparatus;
   said tangible product sales server including:
   tangible server communication means for transmitting data to and receiving data from further devices connected to the network,
   tangible product data storage means for storing product data about the tangible product,
   tangible server user information storage means for storing the data about the user, and
   tangible server control means for controlling said tangible server communication means to receive the at least some of the personal data about the user and the at least some of the ordering data about the intangible product transmitted by said intangible product sales server, and in response to receiving the at least some of the personal data about the user and the at least some of the ordering data about the intangible product, for controlling said tangible server user information storage means to store the received at least some of the personal data about the user, for searching said tangible product data storage means to retrieve information about the tangible product based on the received at least some of the ordering data about the intangible product, for controlling said tangible server communication means to transmit second display data to said user terminal apparatus, the second display data including the retrieved information about the tangible product and a request for the user to provide ordering data related to the tangible product, for controlling said tangible server communication means to receive user-provided ordering data related to the tangible product from said user terminal apparatus, and for controlling said tangible server communication means to transmit the user-provided ordering data related to the tangible product and a request for the availability and delivery time data about the tangible product to said tangible product manufacturer server;

said tangible product manufacturer server for receiving the user-provided ordering data related to the tangible product and the request for the availability and delivery time data about the tangible product, for accessing said tangible product database to obtain the availability and delivery time data about the tangible product, and for transmitting the availability and delivery time data about the tangible product to said tangible server communication means of said tangible product sales server;

said tangible product sales server for controlling said tangible server communication means to receive the availability and delivery time data about the tangible product from said tangible product manufacturer server, for controlling said tangible server communication means to transmit the availability and delivery time data about the tangible product to said user terminal apparatus, and for controlling said tangible server communication means to transmit the at least some of the personal data about the user, the at least some of the ordering data about the intangible product, the ordering data related to the tangible product, and the availability and delivery time data about the tangible product to said finance company server;

said finance company server for receiving the at least some of the personal data about the user, the at least some of the ordering data about the intangible product, the ordering data related to the tangible product, and the availability and delivery time data about the tangible product from said tangible product sales server, for generating estimate sheet data based on the received data, for generating third display data that includes the estimate sheet data and a request for user payment data, for transmitting the third display data to said user terminal apparatus, for receiving the user payment data from said user terminal apparatus, and upon receiving the user payment data, for transmitting a payment settlement notification to said intangible product sales server and to said tangible product sales server.

2. The cooperative sales system according to claim 1, wherein the intangible product for sale by said intangible product sales server is an automobile insurance product.

3. The cooperative sales system according to claim 2, wherein the tangible product for sale by said tangible product sales server is at least one of a car navigating system and a car safety device to be installed on a vehicle covered by the automobile insurance product.

4. A cooperative sales system interconnected via a network for selling an intangible product and for selling a tangible product, said sales system comprising:
a user terminal apparatus connected to the network; and
a plurality of servers, including:
an intangible product sales server connected to the network for carrying out a sale of the intangible product,
a tangible product sales server connected to the network for carrying out a sale of the tangible product, and
a service shop server;
said user terminal apparatus including:
operator means for receiving inputs provided by a user,
terminal communication means for transmitting data to and receiving data from said plurality of servers,
display means for displaying the data received by said terminal communication means, and
terminal control means for controlling said communication means to receive data from at least one of said plurality of servers, for controlling said display means to display the received data, and for controlling said communication means to transmit inputted data that is provided by the user in response to the received data displayed by said display means;
said intangible product sales server including:
intangible server communication means for transmitting data to and receiving data from other devices connected to the network,
intangible product data storage means for storing data about the intangible product,
intangible server user information storage means for storing personal data about the user, and
intangible server control means for controlling said intangible server communication means to transmit first display data to said user terminal apparatus, the first display data including requests for the user to provide personal data about the user and to provide ordering data about the intangible product, for controlling said intangible server communication means to receive user-provided personal data about the user and to receive user-provided ordering data about the intangible product from said user terminal apparatus, and in response to receiving the user-provided personal data and the user-provider ordering data, for searching said intangible product data storage means to retrieve information about the intangible product based on the received ordering data about the intangible product, for controlling said intangible server user information storage means to store the received personal data about the user, for controlling said intangible server communication means to transmit at least some of the received personal data about the user and at least some of the received ordering data about the intangible product to said tangible product sales server, and for controlling said intangible server communication means to transmit the retrieved information about the intangible product to said user terminal apparatus;
said tangible product sales server including:
tangible server communication means for transmitting data to and receiving data from further devices connected to the network,
tangible product data storage means for storing product data about the tangible product,
tangible server user information storage means for storing the data about the user, and tangible server control means for controlling said tangible server communication means to receive the at least some of the personal data about the user and the at least some of the ordering data about the intangible product transmitted by said intangible product sales server, and in response to receiving the at least some of the personal data about the user and the at least some of the ordering data about the intangible product, for controlling said tangible server user information storage means to store the received at least some of the personal data about the user, for searching said tangible product data storage means to retrieve information about the tangible product based on the received at least some of the ordering data about the intangible product, for controlling said tangible server communication means to transmit second display data to said user terminal apparatus, the second display data including the retrieved information about the tangible product and a request for the user to provide ordering data related to the tangible product, for controlling said tangible server communication means to receive user-provided ordering data related to the tangible product from said user terminal apparatus, and for controlling said tangible server communication means to transmit availability and delivery time data about the tangible product to said user terminal apparatus;

said terminal control means of said user terminal apparatus for controlling said communication means of said user terminal apparatus to transmit a request for a service shop location map from said service shop server;

said service shop server including:

service shop server communication means for transmitting data to and receiving data from other devices connected to the network, a shop location database for storing associated location information for each one of a plurality of service shops, an appointment schedule database for storing associated scheduling information for each one of the plurality of service shops, and service shop server control means for controlling said service shop server communication means to receive the request for map screen data from said user terminal apparatus, for controlling said service shop server communication means to obtain at least some of the user-provided personal data about the user and at least some of the user-provided ordering data about the intangible product from said intangible product sales server, for accessing said shop location database to retrieve map information associated with at least one of the plurality of service shops based on the received at least some of the user-provided personal data about the user and at least some of the user-provided ordering data about the intangible product, the at least one of the plurality of service shops being based on proximity to the user and capabilities of that service shop, for generating the service shop location map based on the retrieved map information, for controlling said service shop server communication means to transmit the service shop location map to said terminal communication means of said user terminal apparatus, for controlling said service shop server communication means to receive a user selection of one of the plurality of service shops from said terminal communication means of said user terminal apparatus, for retrieving the scheduling information associated with the selected one of the plurality of service shops from said appointment schedule database, for controlling said service shop server communication means to transmit the retrieved scheduling information to said user terminal apparatus, and for controlling said service shop server communication means to receive a user selected appointment date from said terminal communication means of said user terminal apparatus.

5. The cooperative sales system according to claim 4, wherein said tangible server control means controls said tangible server communication means to transmit the retrieved information about the tangible product to said service shop server, to receive information about installing the tangible product in a vehicle of the user at the selected one of the plurality of service shops from said service shop server, and to transmit the information about installing the tangible product to said terminal communication means of said user terminal.

6. An intangible product sales apparatus connected over a network to a user terminal apparatus and to a tangible product sales server for selling an intangible product and for selling a tangible product, said apparatus comprising:

communication means for transmitting data to and receiving data from other devices connected to the network;

product data storage means for storing data about the intangible product;

user information storage means for storing personal information about a user of the user terminal apparatus;

a purchaser database for registering purchasers of the intangible product; and control means for controlling said communication means to transmit first display data to the user terminal apparatus, the first display data including requests for the user to provide the personal information about the user and to provide ordering data about the intangible product, for controlling said communication means to receive user-provided personal information about the user and to receive user-provided ordering data about the intangible product from the user terminal apparatus, for controlling said user information storage means to store the received personal information about the user, and in response to receiving the user-provided personal data and the user-provided ordering data about the intangible product, for searching said data storage means to retrieve information about the intangible product based on the received ordering data about the intangible product, for controlling said communication means to transmit the retrieved information about the requested intangible product to the user terminal apparatus, for controlling said communication means to transmit at least some of the received personal data about the user and at least some of the received ordering data about the intangible product to the tangible product sales server, and for controlling said communication means to receive payment settlement notification from a finance company server, the payment settlement notification being transmitted by the finance company server upon receiving user payment data from the user terminal apparatus, the user payment data being transmitted from the user terminal apparatus to the finance company server in reply to third display data transmitted from the finance company server to the user terminal apparatus, the third display data including estimate sheet data and a request for user payment data, the estimate sheet data being generated by the finance company server based on the at least some of the personal data about the user, the at least some of the ordering data about the intangible product, user-provided ordering data related to the tangible product, and availability and delivery time data about the tangible product being transmitted by the tangible product sales server to the finance company server, the availability and delivery time data about the tangible product being transmitted from a tangible product manufacturer server to the tangible product sales server in response to the user-provided ordering data related to the tangible product and a request for the availability and delivery time data about the tangible product being transmitted from the tangible product sales server to the tangible product manufacturer server, the user-provided ordering data related to the tangible product being transmitted from the user terminal apparatus to the tangible product sales server in response to second display data being transmitted from the tangible product sales server to the user terminal apparatus, the second display data including information about the tangible product and a request for the user to provide the ordering data related to the information about the tangible product, the information about the tangible product being retrieved by the tangible product sales server in response to the tangible product sales server receiving the at least some of the personal data about the user and the at least some of the ordering data about the intangible product from said communications means;

said control means, upon receiving the payment settlement notification, controlling said purchaser database to register the user as a purchaser of the intangible product.

7. The intangible product sales apparatus according to claim 6, wherein the intangible product is an automobile insurance product and the tangible product is at least one of a car navigating system and a car safety device to be installed on a vehicle covered by the automobile insurance product.

8. A tangible product sales apparatus connected over a network to a user terminal apparatus and to an intangible product sales server for selling an intangible product and for selling a tangible product, the intangible product sales server transmitting first display data to the user terminal apparatus, the first display data including requests for a user of the user terminal apparatus to provide personal data about the user and to provide ordering data about the intangible product, the intangible product sales server receiving user-provided personal data about the user and user-provided ordering data about the intangible product from the user terminal apparatus and then retrieving information about the intangible product requested by the user based on the received ordering data about the intangible product, said tangible product sales apparatus comprising:

communication means for transmitting data to and receiving data from other devices connected to the network;

product data storage means for storing data about the tangible product;

user information storage means for storing personal information about a user;

a purchaser database for registering purchasers of the tangible product; and control means for controlling said communication means to receive at least some of the personal information about the user and at least some of the ordering data about the intangible product from the intangible product sales server, and in response to receiving the user-provided personal data and the user-provided ordering data, for controlling said user information storage means to store the received at least some of the personal data about the user, for searching said product data storage means to retrieve information about the tangible product based on the received at least some of the ordering data about intangible product, for controlling said communication means to transmit second display data to the user terminal apparatus, the second display data including the retrieved information about the tangible product and a request for the user to provide ordering data related to the retrieved tangible product, for controlling said communication means to receive user-provided ordering data related to the tangible product from the user terminal apparatus, for controlling said tangible server communication means to transmit the user-provided ordering data related to the tangible product and a request for the availability and delivery time data about the tangible product to a tangible product manufacturer server, for controlling said tangible server communication means to receive the availability and delivery time data about the tangible product from the tangible product manufacturer server, for controlling said communication means to transmit availability and delivery time data about the tangible product to the user terminal apparatus, for controlling said tangible server communication means to transmit the at least some of the personal data about the user, the at least some of the ordering data about the intangible product, the user-provided ordering data related to the tangible product, and the availability and delivery time data about the tangible product to a finance company server, for controlling said communication means to receive payment settlement notification from the finance company server, the payment settlement notification being transmitted by the finance company server upon receiving user payment data from the user terminal apparatus, the user payment data being transmitted from the user terminal apparatus to the finance company server in reply to third display data transmitted from the finance company server to the user terminal apparatus, the third display data including an estimate sheet data and a request for user payment data, the estimate sheet data being generated by the finance company server based on the at least some of the personal data about the user, the at least some of the ordering data about the intangible product, the user-provided ordering data related to the tangible product, and the availability and delivery time data about the tangible product received from said tangible product sales server;

said control means, upon receiving the payment settlement notification, controlling said purchaser database to register the user as a purchaser of the tangible product.

9. The tangible product sales apparatus according to claim 8, wherein the intangible product is an automobile insurance product and the tangible product is at least one of a car navigating system and a car safety device to be installed on a vehicle covered by the automobile insurance product.

* * * * *